US012463391B2

(12) United States Patent
Fitzpatrick

(10) Patent No.: US 12,463,391 B2
(45) Date of Patent: Nov. 4, 2025

(54) MODULAR TELECOMMUNICATIONS PLUG AND METHOD

(71) Applicant: COMMSCOPE TECHNOLOGIES LLC, Hickory, NC (US)

(72) Inventor: Brian J. Fitzpatrick, McKinney, TX (US)

(73) Assignee: CommScope Technologies LLC, Hickory, NC (US)

( * ) Notice: Subject to any disclaimer, the term of this patent is extended or adjusted under 35 U.S.C. 154(b) by 347 days.

(21) Appl. No.: 17/922,449

(22) PCT Filed: Apr. 30, 2021

(86) PCT No.: PCT/US2021/030232
§ 371 (c)(1),
(2) Date: Oct. 31, 2022

(87) PCT Pub. No.: WO2021/222788
PCT Pub. Date: Nov. 4, 2021

(65) Prior Publication Data

US 2023/0178945 A1 Jun. 8, 2023

Related U.S. Application Data

(60) Provisional application No. 63/017,706, filed on Apr. 30, 2020.

(51) Int. Cl.
*H01R 24/64* (2011.01)
*H01R 13/58* (2006.01)
(Continued)

(52) U.S. Cl.
CPC ........... *H01R 24/64* (2013.01); *H01R 13/582* (2013.01); *H01R 13/6463* (2013.01); *H01R 2107/00* (2013.01)

(58) Field of Classification Search
CPC .. H01R 24/64; H01R 13/582; H01R 13/6463; H01R 2107/00
See application file for complete search history.

(56) References Cited

U.S. PATENT DOCUMENTS 7,001,204 B1 * 2/2006 Lin ...................... H01R 4/2433 439/418
7,175,476 B2 * 2/2007 Kim ..................... H05K 1/0228 439/620.11
(Continued)

FOREIGN PATENT DOCUMENTS

CN 1347172 A 5/2002
CN 106936039 A 7/2017
(Continued)

OTHER PUBLICATIONS

Extended European Search Report for Application No. 21797224.9 mailed Apr. 29, 2024.
(Continued)

*Primary Examiner* — Justin M Kratt
(74) *Attorney, Agent, or Firm* — Merchant & Gould P.C.

(57) ABSTRACT

A modular plug is disclosed for terminating a telecommunications cable having twisted pairs of wires. The modular plug includes a housing defining an internal cavity and slots positioned toward a distal end of the housing, each slot being parallel to a central axis of the modular plug. A wire manager is fitted inside the internal cavity, and defines channels for positioning the twisted pairs of wires inside the housing. A wire sled extends from the wire manager and defines a plurality of grooves, each groove shaped to position an individual wire from the twisted pairs of wires at an angle with respect to the central axis. The modular plug further includes a plurality of plug contacts. Each plug contact is
(Continued)

held by a slot of the housing and is structured to form an electrical interface with a wire positioned by the wire sled.

20 Claims, 24 Drawing Sheets

(51) Int. Cl.
*H01R 13/6463* (2011.01)
*H01R 107/00* (2006.01)

(56) References Cited

U.S. PATENT DOCUMENTS

| | | | | |
|---|---|---|---|---|
| 7,413,464 | B1 * | 8/2008 | Chen | H01R 13/5829 439/417 |
| 7,484,993 | B2 * | 2/2009 | Amidon | H01R 13/5825 439/418 |
| 7,918,684 | B2 * | 4/2011 | Lu | H01R 4/2433 439/395 |
| 7,967,642 | B2 * | 6/2011 | Schoene | A61P 35/00 439/660 |
| 8,007,311 | B2 * | 8/2011 | Hogue | H01R 13/6467 439/676 |
| 8,016,619 | B2 * | 9/2011 | Hogue | H01R 9/031 439/638 |
| 8,235,757 | B2 * | 8/2012 | Brear | H01R 4/242 439/76.1 |
| 8,485,850 | B2 * | 7/2013 | Nesme | H01R 13/6461 439/620.11 |
| 8,702,444 | B2 * | 4/2014 | Maranto | H01R 24/64 439/418 |
| 8,979,578 | B2 * | 3/2015 | Hogue | H01R 9/031 439/540.1 |
| 9,130,283 | B1 * | 9/2015 | Lin | H01R 4/2433 |
| 9,537,226 | B2 * | 1/2017 | Krome | H01R 24/64 |
| 9,843,121 | B1 * | 12/2017 | Sparrowhawk | H01R 24/64 |
| 2005/0181676 | A1 * | 8/2005 | Caveney | H01R 13/66 439/676 |
| 2007/0105453 | A1 * | 5/2007 | Caveney | H01R 24/64 439/676 |
| 2007/0161296 | A1 * | 7/2007 | Carroll | H01R 13/65915 439/676 |
| 2008/0146093 | A1 * | 6/2008 | Caveney | H01R 13/665 439/890 |
| 2009/0203252 | A1 | 8/2009 | Stephens et al. | |
| 2014/0248805 | A1 * | 9/2014 | Pepe | H01R 13/6461 439/676 |
| 2014/0305700 | A1 | 10/2014 | Mattson et al. | |
| 2014/0315420 | A1 * | 10/2014 | Sticker | H01R 13/506 439/374 |
| 2017/0317450 | A1 * | 11/2017 | Valenti | H01R 13/6461 |
| 2023/0178945 | A1 * | 6/2023 | Fitzpatrick | H01R 13/6463 439/676 |

FOREIGN PATENT DOCUMENTS

| | | | |
|---|---|---|---|
| CN | 110622369 | A | 12/2019 |
| EP | 1 188 204 | B1 | 8/2008 |
| GB | 2 448 937 | B | 10/2009 |
| KR | 10-0685510 | B1 | 2/2007 |
| KR | 10-2016-0000889 | A | 1/2019 |
| KR | 10-2019-0000889 | A | 1/2019 |

OTHER PUBLICATIONS

International Search Report and Written Opinion of the International Searching Authority for International Patent Application No. PCT/US2021/030232 mailed Aug. 20, 2021, 8 pages.

* cited by examiner

MODULAR TELECOMMUNICATIONS PLUG AND METHOD

CROSS-REFERENCE TO RELATED APPLICATION

This application is a National Stage Application of PCT/US2021/030232, filed on Apr. 30, 2021, which claims the benefit of U.S. Patent Application Ser. No. 63/017,706, filed on Apr. 30, 2020, the disclosures of which are incorporated herein by reference in their entireties. To the extent appropriate, a claim of priority is made to each of the above disclosed applications.

BACKGROUND

Telecommunications networks utilize cables designed to maintain signal integrity. The cables include pairs of twisted copper wires surrounded by a cable jacket. The cables are terminated by a plug that secures the ends of the copper wires for alignment and contact with a series of plug contacts. When the plug is inserted into a matching jack, the plug locks into place and the plug contacts transmit the signal to corresponding contacts inside the jack. An RJ45 type connector plug is one example of a plug that can be used to terminate a cable.

Each plug contact includes tines where contact is made with a copper wire. The tines of each plug contact are offset towards opposite sides of the mating wire. The offset is small because the plug contacts are slotted close together inside the plug housing in order to align with the contacts of the jack. A reliable connection requires that the tines of each plug contact fall on opposite sides of each wire so that they straddle the wire. When this occurs, the plug contact and wire deform with some resilience such that a contact force is created and maintained.

It can be challenging to achieve reliable connections between the plug contacts and the copper wires inside the plug because it is difficult to align the tines of the planar plug contacts with the linearly positioned wires. For this and other reasons, improvements are desirable.

SUMMARY

One aspect relates to a modular plug for terminating a telecommunications cable having twisted pairs of wires. The modular plug comprises a housing defining an internal cavity and one or more slots on a distal end thereof; one or more plug contacts held by the slots of the housing, each plug contact structured to form an electrical interface with a wire from the twisted pairs of wires; a wire manager inside the internal cavity, the wire manager structured to receive the twisted pairs of wires inside the housing; and a wire sled extending from the wire manager, the wire sled defining one or more grooves each shaped to position a wire from the twisted pairs of wires at an angle with respect to a corresponding plug contact.

Another aspect relates to a method of terminating a cable using a modular plug. The method comprising positioning twisted pairs of wires from the cable through one or more channels defined by a wire manager of the modular plug; untwisting the twisted pairs of wires; positioning the wires on a wire sled of the modular plug, the wire sled defining a plurality of grooves for positioning each individual wire at an angle with respect to a plug contact; trimming the wires to be flush with a distal end of the wire sled; inserting the wire manager and wire sled into a housing of the modular plug; and crimping the plug contacts to contact the individual wires positioned by the wire sled.

Another aspect relates to a modular plug for terminating a telecommunications cable having twisted pairs of wires. The modular plug comprising a housing defining an internal cavity and slots positioned toward a distal end, each slot being parallel to a central axis of the modular plug; a wire manager fitted inside the internal cavity, the wire manager defining channels for positioning the twisted pairs of wires inside the housing; a wire sled extending from the wire manager, the wire sled defining a plurality of grooves, each groove shaped to position an individual wire from the twisted pairs of wires at an angle with respect to the central axis; and a plurality of plug contacts, each plug contact held by a slot on the distal end of the housing, and structured to form an electrical interface with a wire positioned by the wire sled.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DESCRIPTION OF THE FIGURES

The following drawing figures, which form a part of this application, are illustrative of described technology and are not meant to limit the scope of the disclosure in any manner.

DETAILED DESCRIPTION

Figure 1:
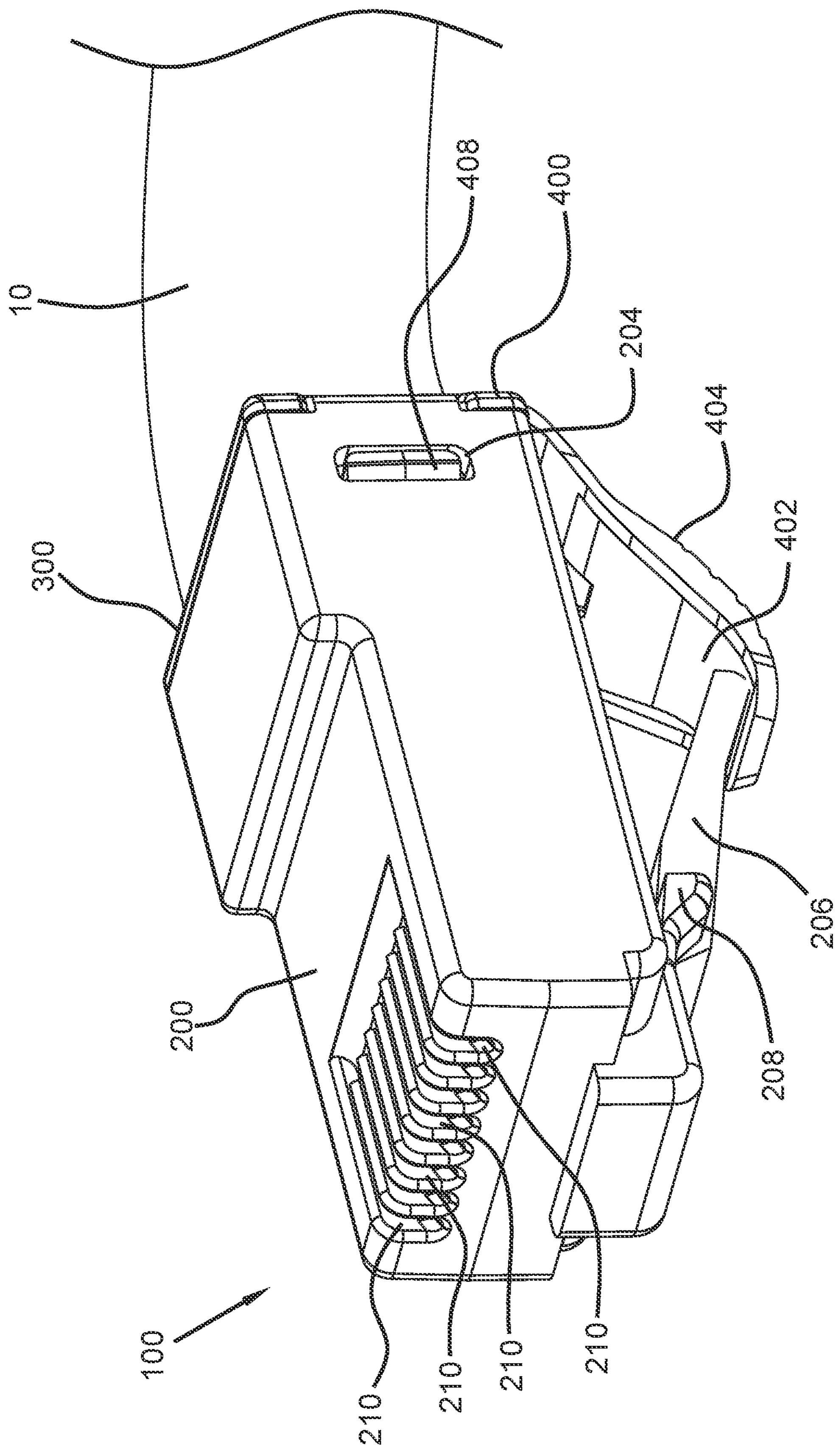
FIG. 1 is a perspective view of a telecommunications cable terminated by a modular plug.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
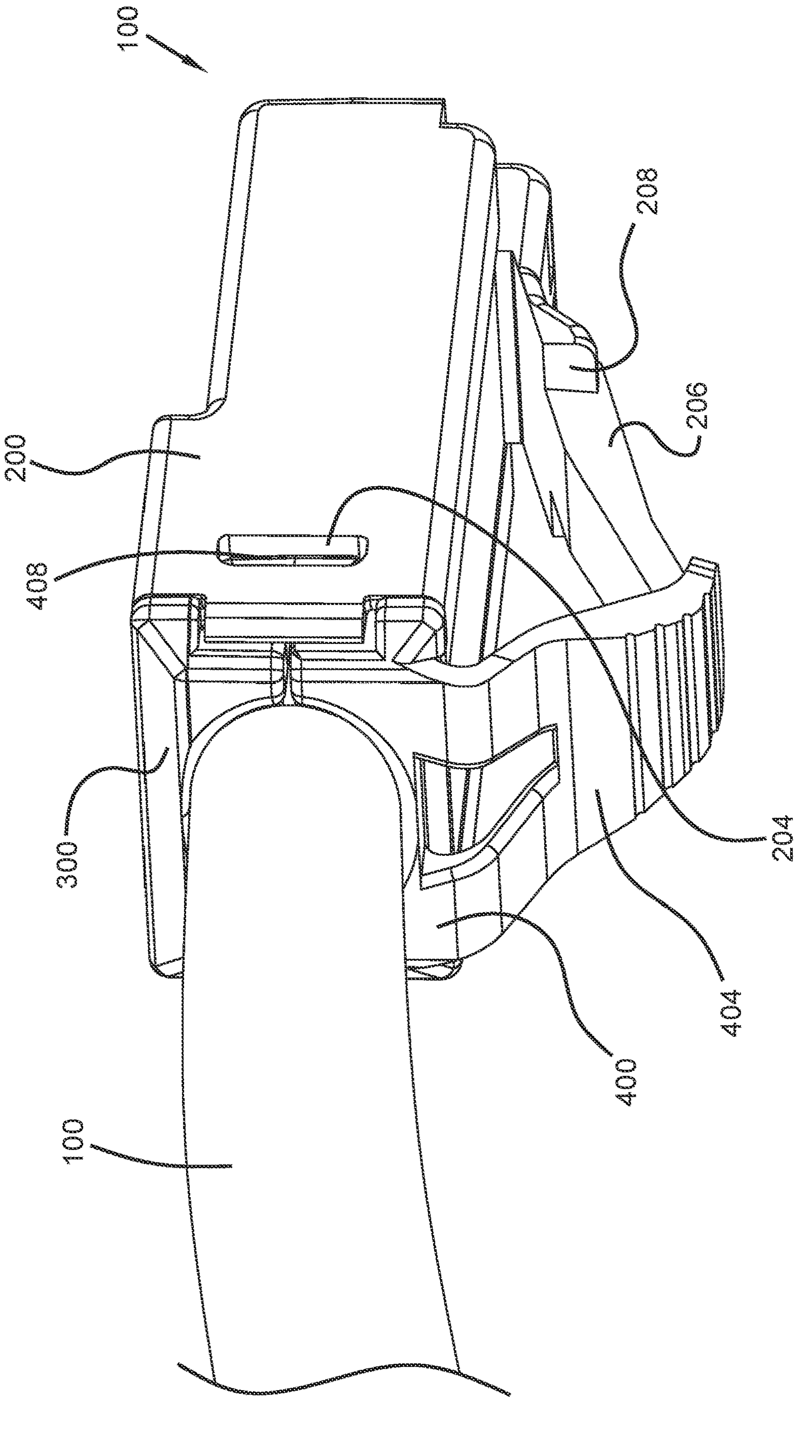
FIG. 2 is another perspective view of the telecommunications cable and modular plug.
Figure 3:
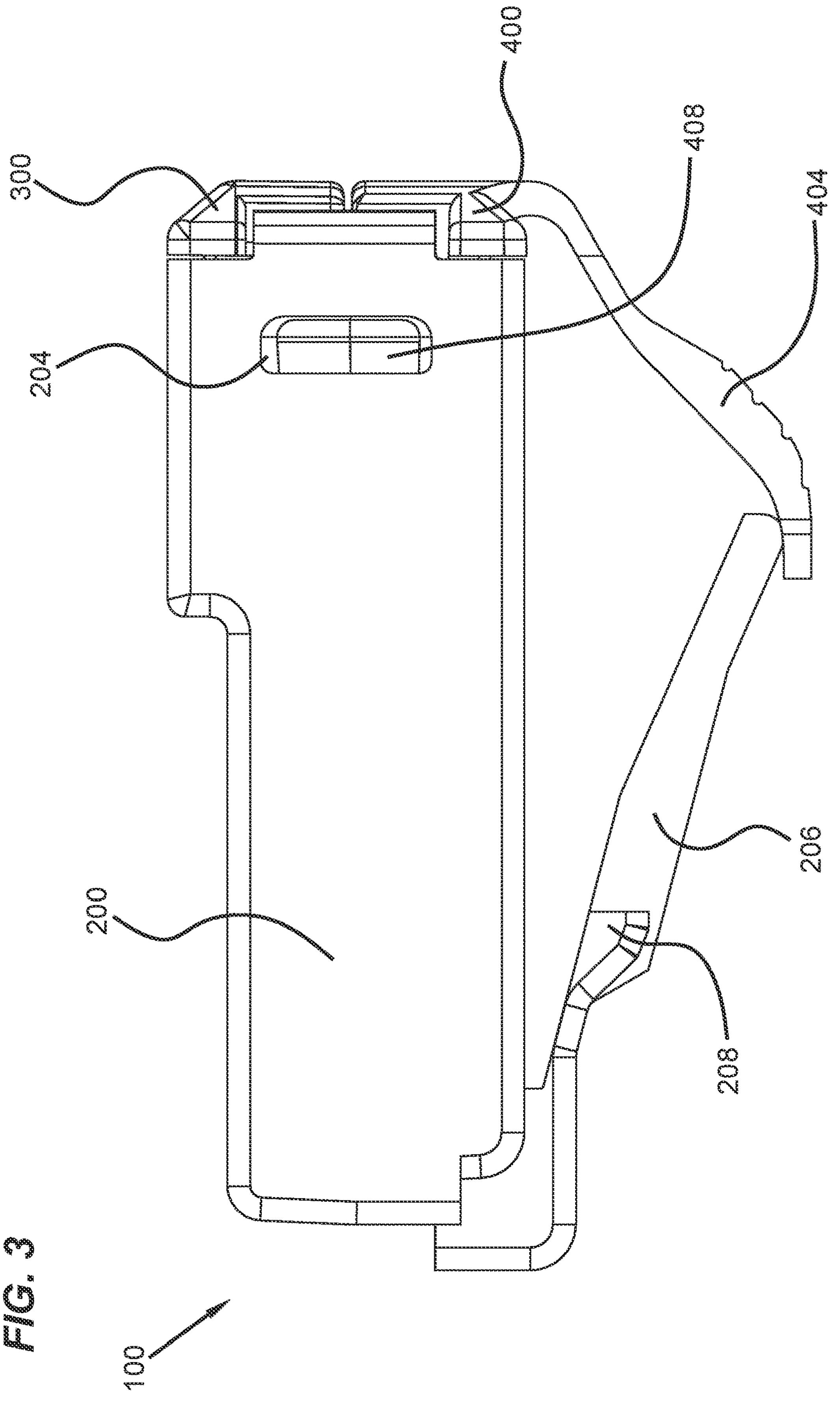
FIG. 3 is a right side view of the modular plug.
Figure 4:
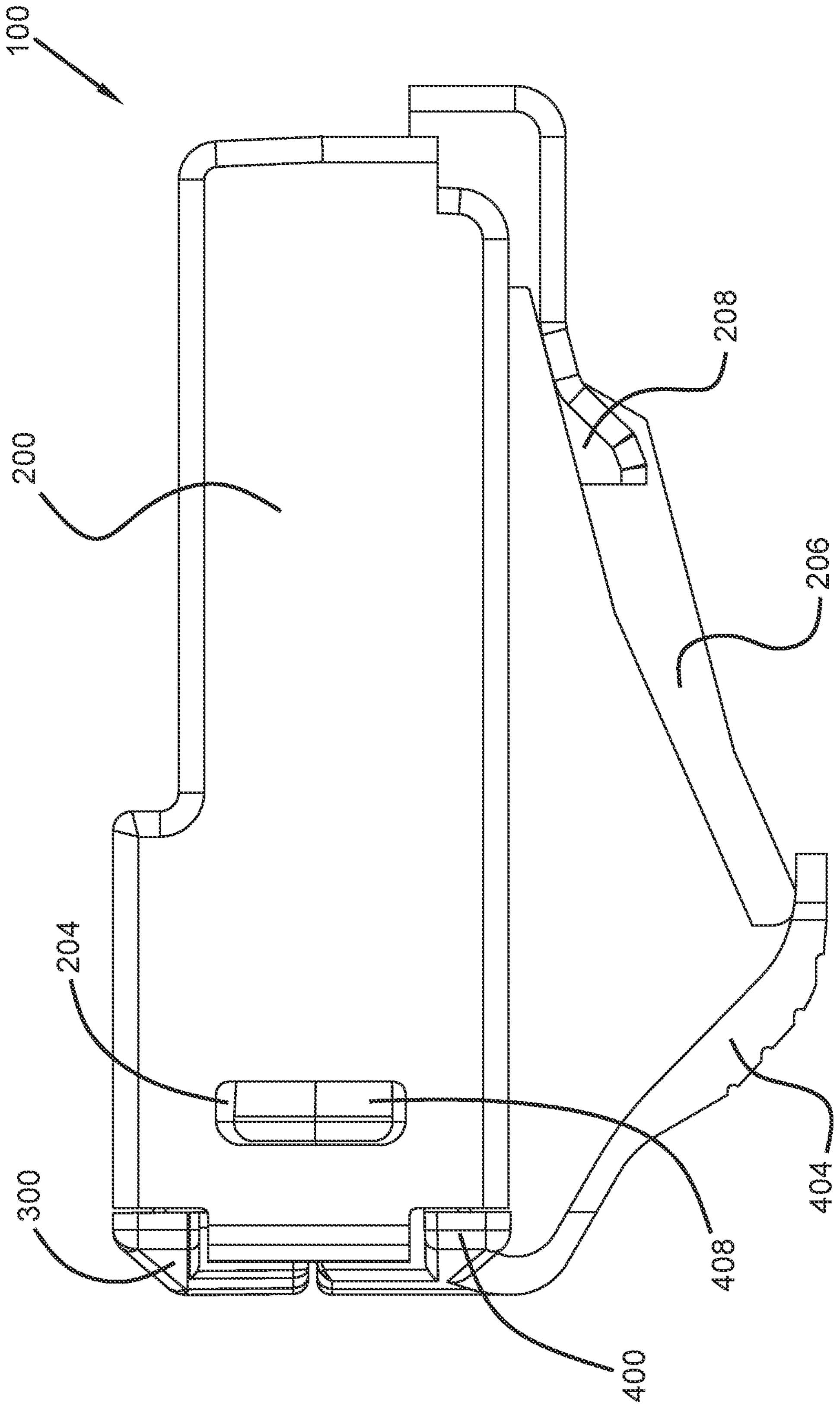
FIG. 4 is a left side view of the modular plug.

FIGS. 1 and 2 are perspective views of a telecommunications cable 10 terminated by a modular plug 100. The telecommunications cable 10 includes twisted pairs of wires housed inside a protective outer jacket. The twisted pairs of wires are configured to transmit signals. For example, information such as video, audio, and data may be transmitted in the form of balanced signals over a pair of twisted wires. The transmitted signal is defined by the voltage difference between the wires. The telecommunications cable 10 includes four twisted pairs of wires such that the telecommunications cable 10 includes eight individual wires in total.

As shown in FIGS. 1 and 2, the modular plug 100 is configured to terminate the telecommunications cable 10. In particular, the modular plug 100 is configured to terminate the twisted pairs of wires housed inside the jacket of the telecommunications cable 10.

FIGS. 3-9 depict right side, left side, front, rear, top, bottom, and exploded views, respectively, of the modular plug 100. As shown in FIGS. 3-9, the modular plug 100 includes a housing 200, a wire manager 300, a rear component 400, and a wire sled 500. In some embodiments, the modular plug 100 includes a hood 600 (see FIG. 9) that snap fits over the wire sled 500. As will be described in more detail, the wire manager 300, rear component 400, and wire sled 500 are assembled together and housed inside an internal cavity of the housing 200.

Figure 5:
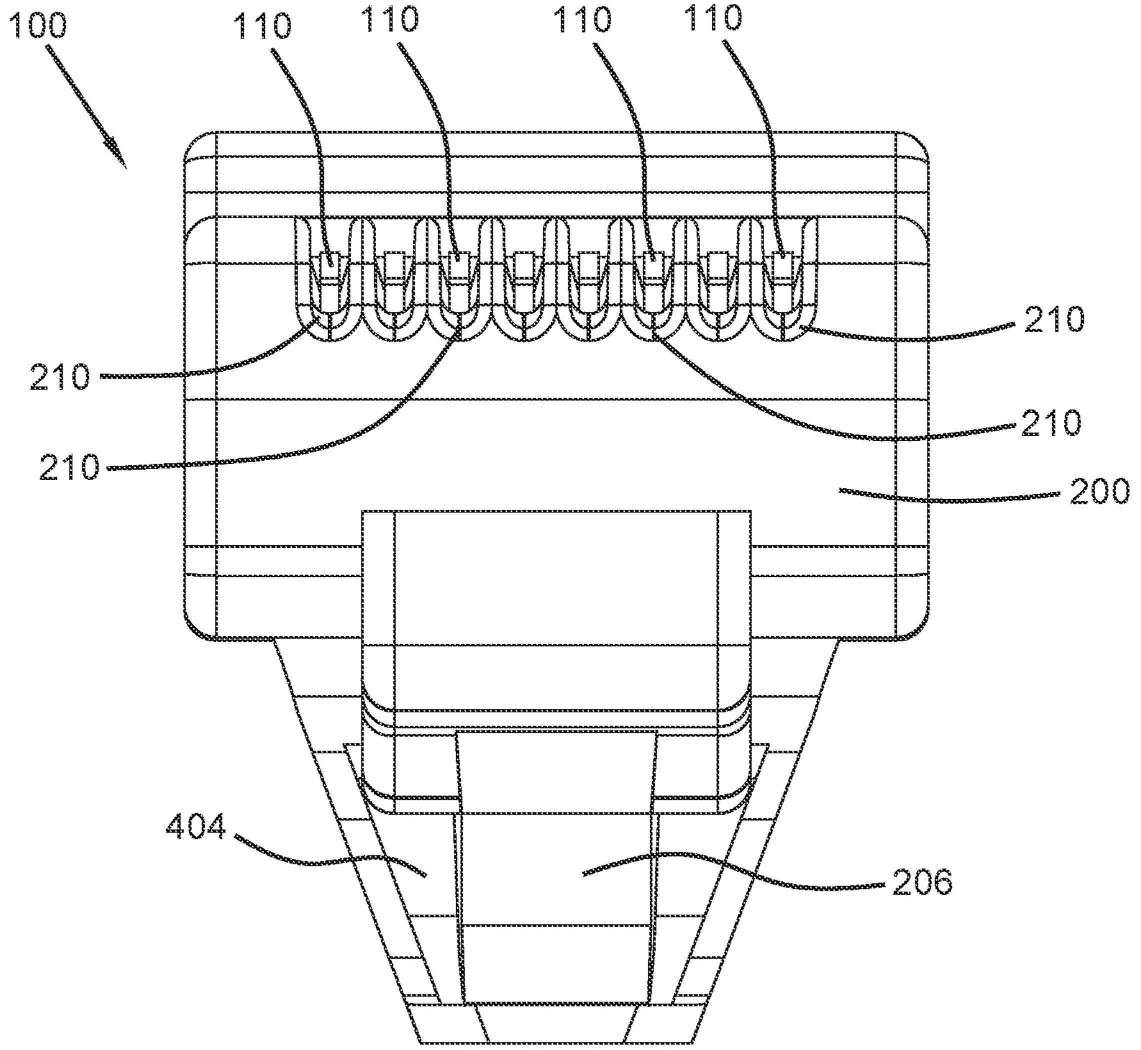
FIG. 5 is a front view of the modular plug.
Figure 6:
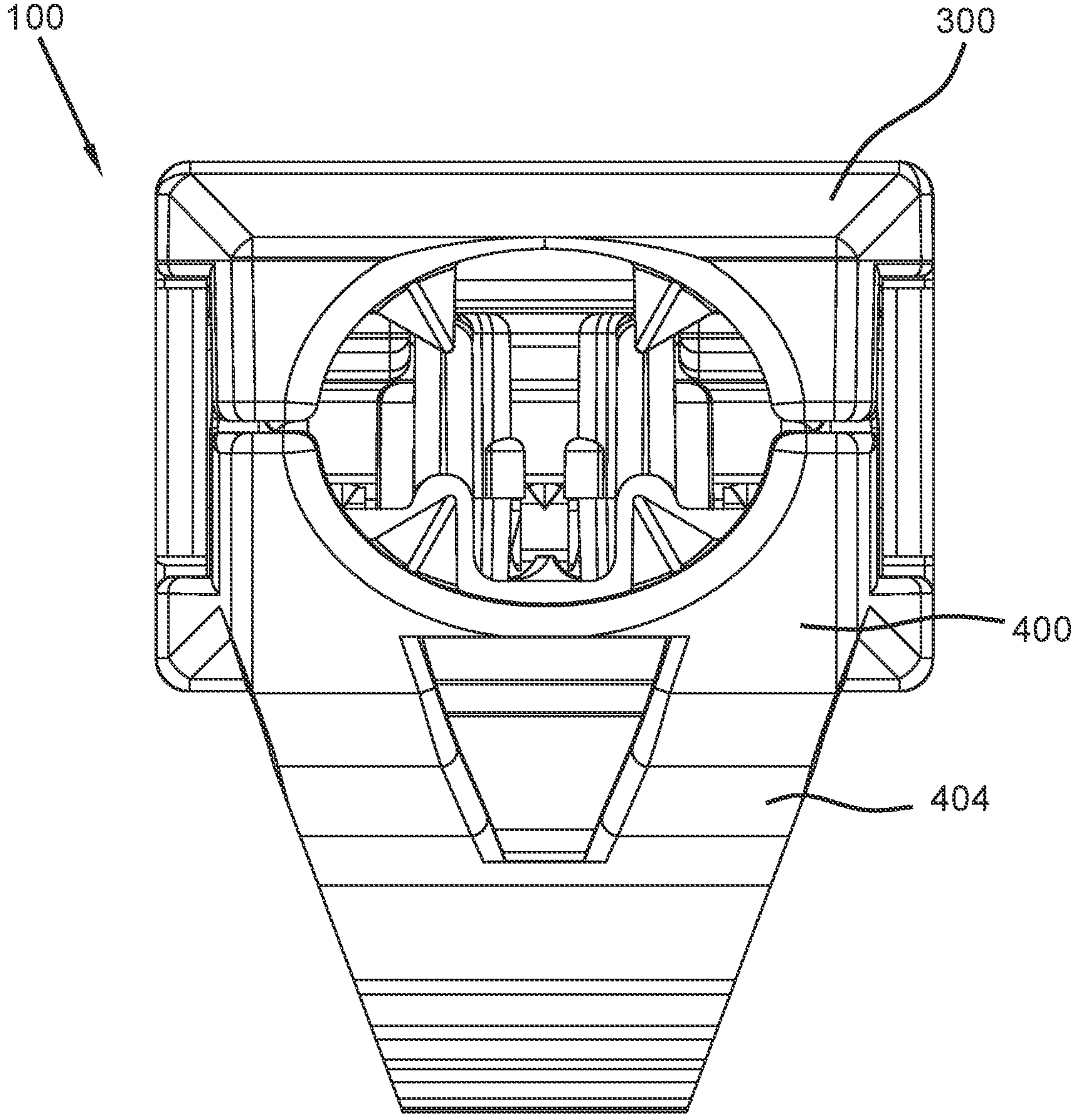
FIG. 6 is a rear view of the modular plug.
Figure 7:
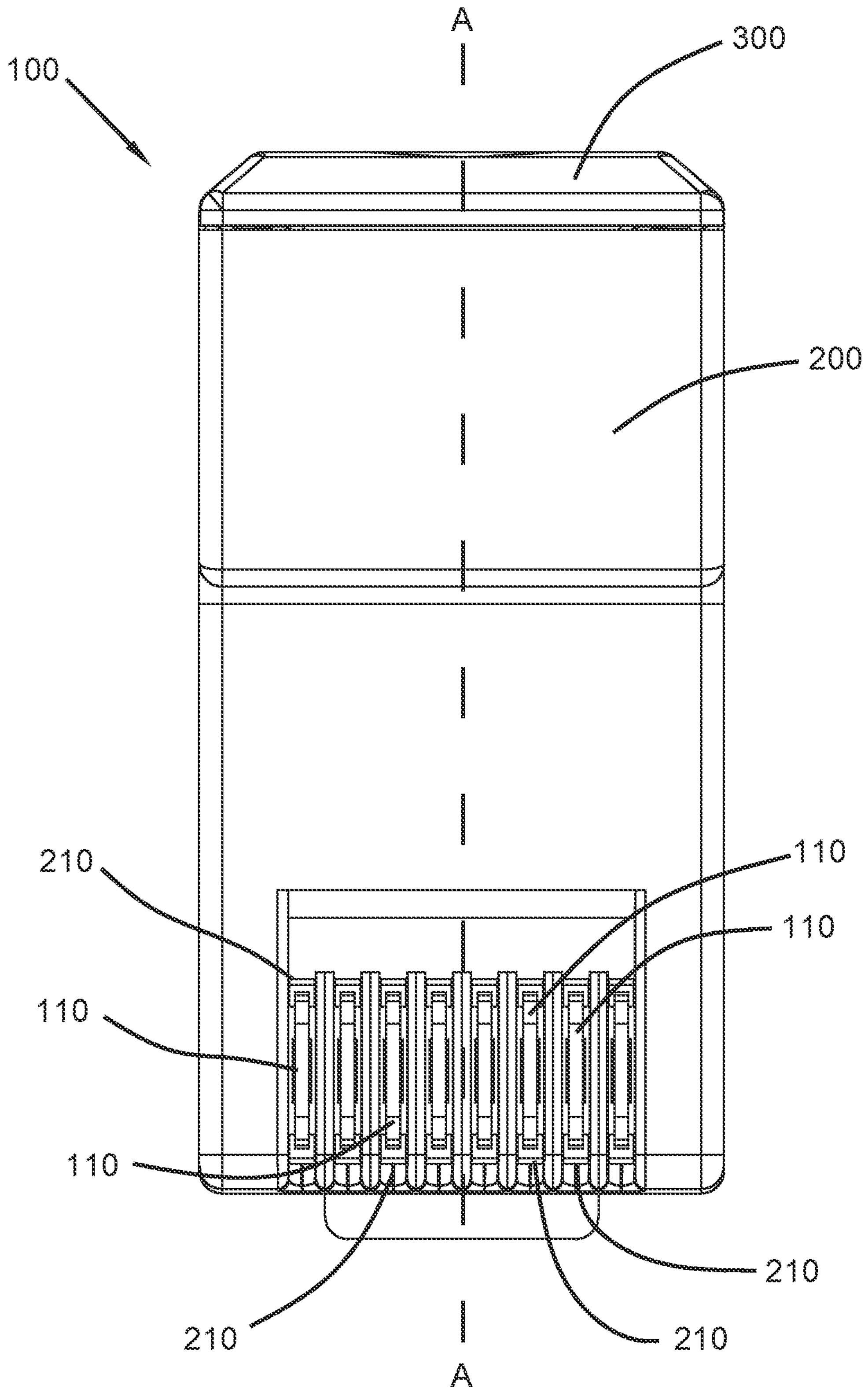
FIG. 7 is a top view of the modular plug.
Figure 8:
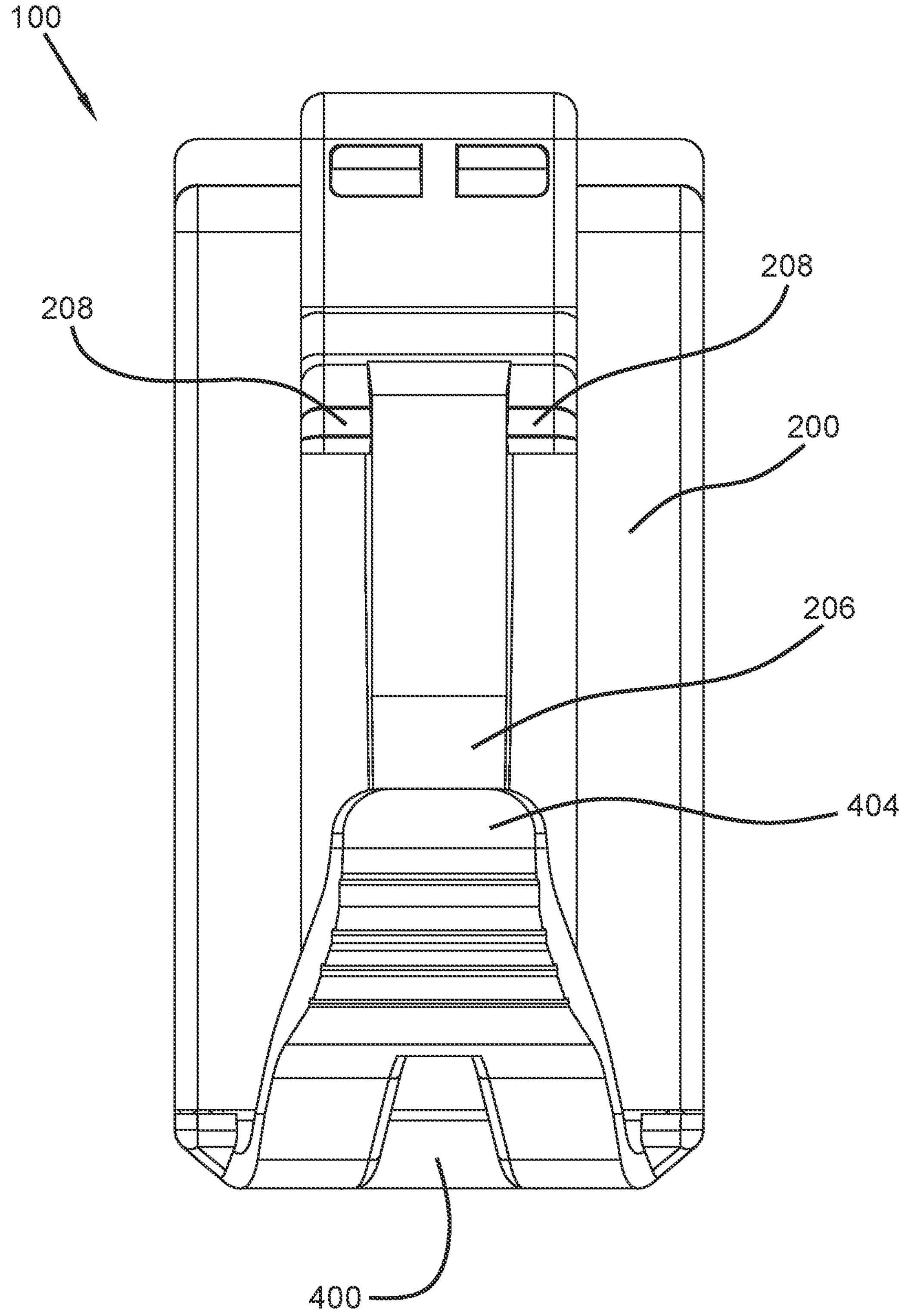
FIG. 8 is a bottom view of the modular plug.
Figure 9:
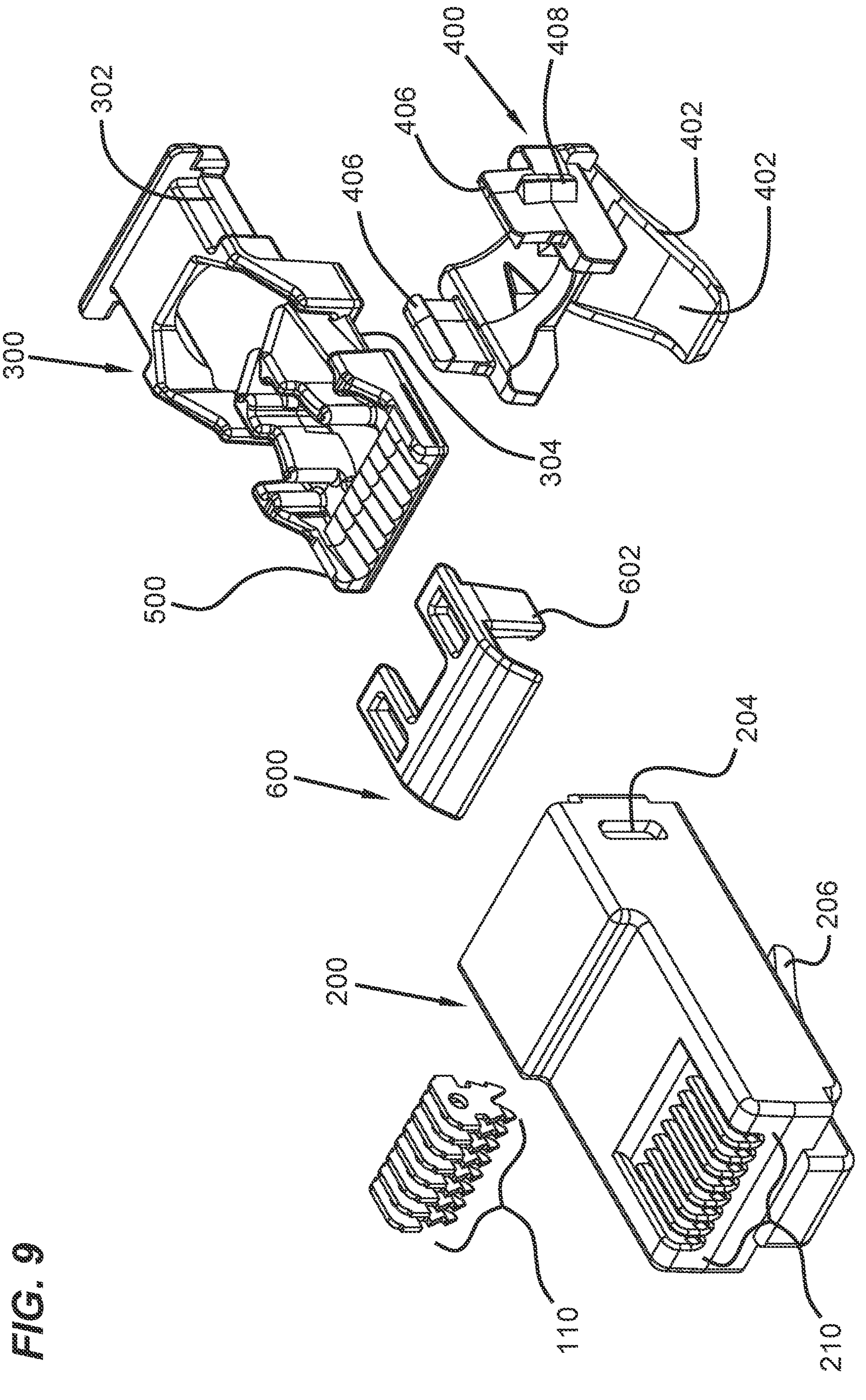
FIG. 9 is an exploded view of the modular plug.

The housing 200 includes an array of slots 210 along a distal end of the housing. As shown in FIGS. 5, 7, and 9, the modular plug 100 includes a plurality of plug contacts 110 held inside the slots 210. Each plug contact 110 is configured to electrically connect the twisted pairs of wires in the telecommunications cable 10 to a contact of a telecommunications jack. Each plug contact 110 is held by a slot 210 to be parallel with a central axis AA of the modular plug 100 (see FIG. 7) such that each plug contact 110 is aligned with a corresponding contact of a telecommunications jack when the modular plug is inserted into the jack.

The wire sled 500 includes a plurality of grooves 502 to align each individual wire from the telecommunications cable 10 with a plug contact 110. As will be described in more detail, each groove 502 is structured to position an individual wire from the twisted pairs of wires in the telecommunications cable 10 at an angle with respect to a corresponding plug contact 110. In one embodiment, the wire sled 500 includes ribs 508 on opposite sides. The ribs 508 are structured to create an interference with the housing 200 to ensure that the wire sled 500 is centered inside the internal cavity of the housing 200. In the example embodiment shown in the figures, there are eight plug contacts, eight slots, and eight grooves. Accordingly, the modular plug 100 may correspond to an RJ-45 jack. However, other configurations are also possible.

The housing 200 further includes a latching handle 206 and shoulders 208. The latching handle 206 and shoulders 208 are configured to engage a corresponding structure in a receptacle of a telecommunications jack to secure the modular plug 100 in the telecommunications jack.

The rear component 400 has an arm 404 that extends therefrom. The arm 404 can include a depression 402 that receives a distal end of the latching handle 206 of the housing 200. The arm 404 functions to prevent the latching handle 206 from snagging or being snagged.

The arm 404 can also function as an actuator for the latching handle 206 that transmits a pressure asserted onto the arm 404 to actuate the latching handle 206 to insert or remove the modular plug 100 from a jack. Thus, the difficulty of actuating the latching handle 206 due to the relatively small size of the modular plug 100 is reduced or eliminated by the arm 404.

The rear component 400 further includes latching members 406. Each latching member 406 engages a corresponding edge 302 on the wire manager 300. Accordingly, the rear component 400 is configured to snap-fit onto the wire manager 300.

The hood 600 has latching members 602. Each latching member 602 engages a corresponding edge 304 on the wire manager 300. Accordingly, the hood 600 is configured to snap-fit onto the wire manager 300. In alternative embodiments, the hood 600 is integral with the wire manager 300 such that the hood 600 is not a separate component.

The housing 200 includes slots 204 on opposite sides of the housing. Each slot 204 receives a corresponding tab 408 of the rear component 400. Thus, the housing 200 is configured to house and secure the wire manager 300 with the hood 600 and rear component 400 attached thereto when inserted inside the housing 200.

FIGS. 10-16 are perspective, top, front, right side, left side, bottom, and rear views, respectively, of the wire manager 300. The wire manager 300 is fitted inside the internal cavity of the housing 200, and receives the pairs of twisted wires from the telecommunications cable 10 through a rear portion 340. The wire manager 300 defines a central channel 308 and lateral channels 312 on opposite sides of the central channel 308 to manage the pairs of twisted wires.

The wire manager 300 has internal walls 306 that define the central channel 308 and outer walls 310 that define with the internal walls 306 the lateral channels 312. The internal and outer walls 306, 310 are flexible to accommodate the pairs of twisted wires. While the example embodiments depicted in the drawings show the outer walls 310 as part of the wire sled 500, in alternative embodiments the outer walls 310 can be part of the wire manager 300 without being a part of the wire sled 500. Additionally, while the example embodiments depicted in the figures show the wire sled 500 as integral with the wire manager 300, in alternative embodiments the wire sled 500 can be a separate component that attaches to the wire manager 300.

Figure 11:
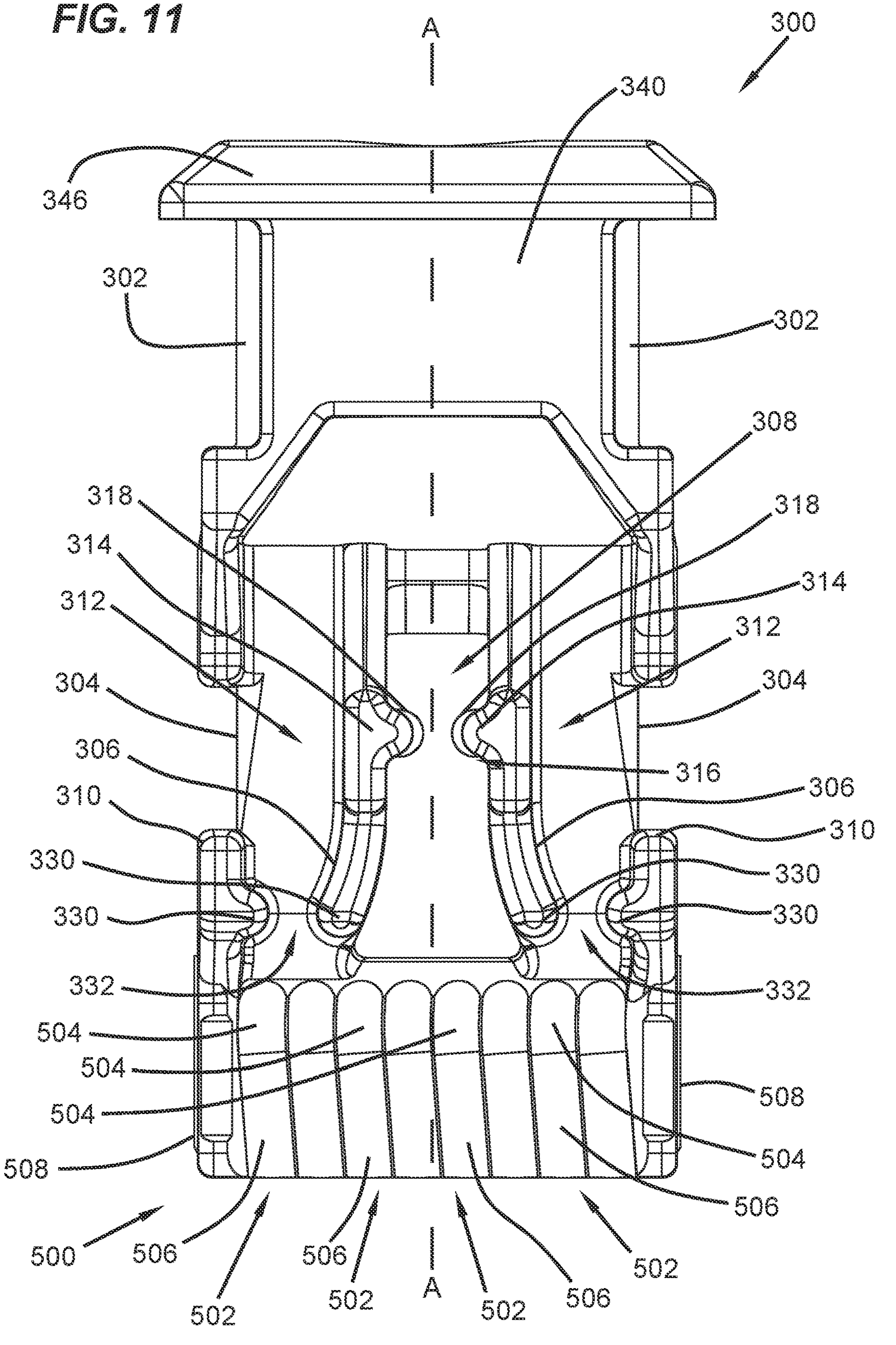
FIG. 11 is a top view of the wire manager.
Figure 12:
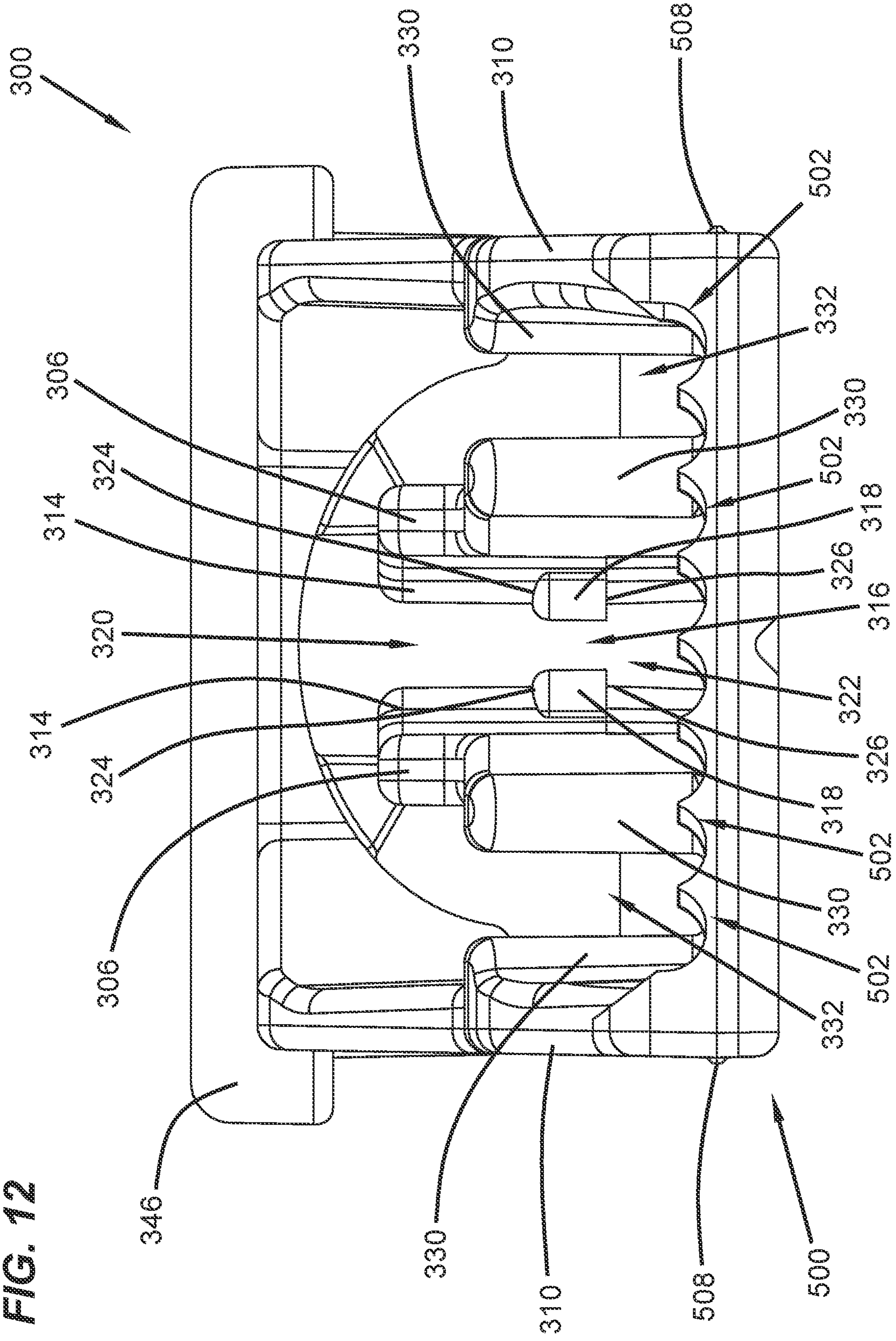
FIG. 12 is a front view of the wire manager.
Figure 13:
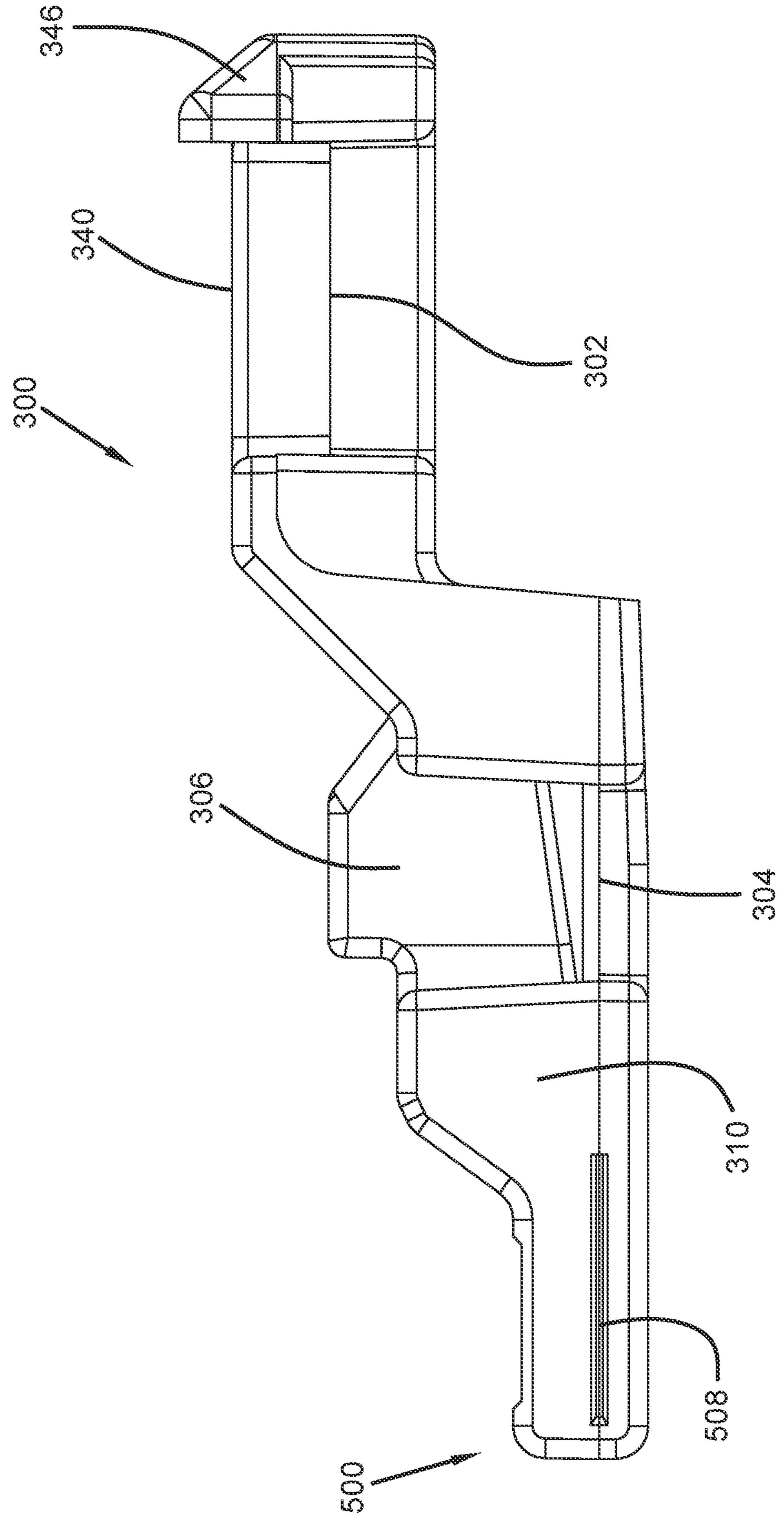
FIG. 13 is a right side view of the wire manager.
Figure 14:
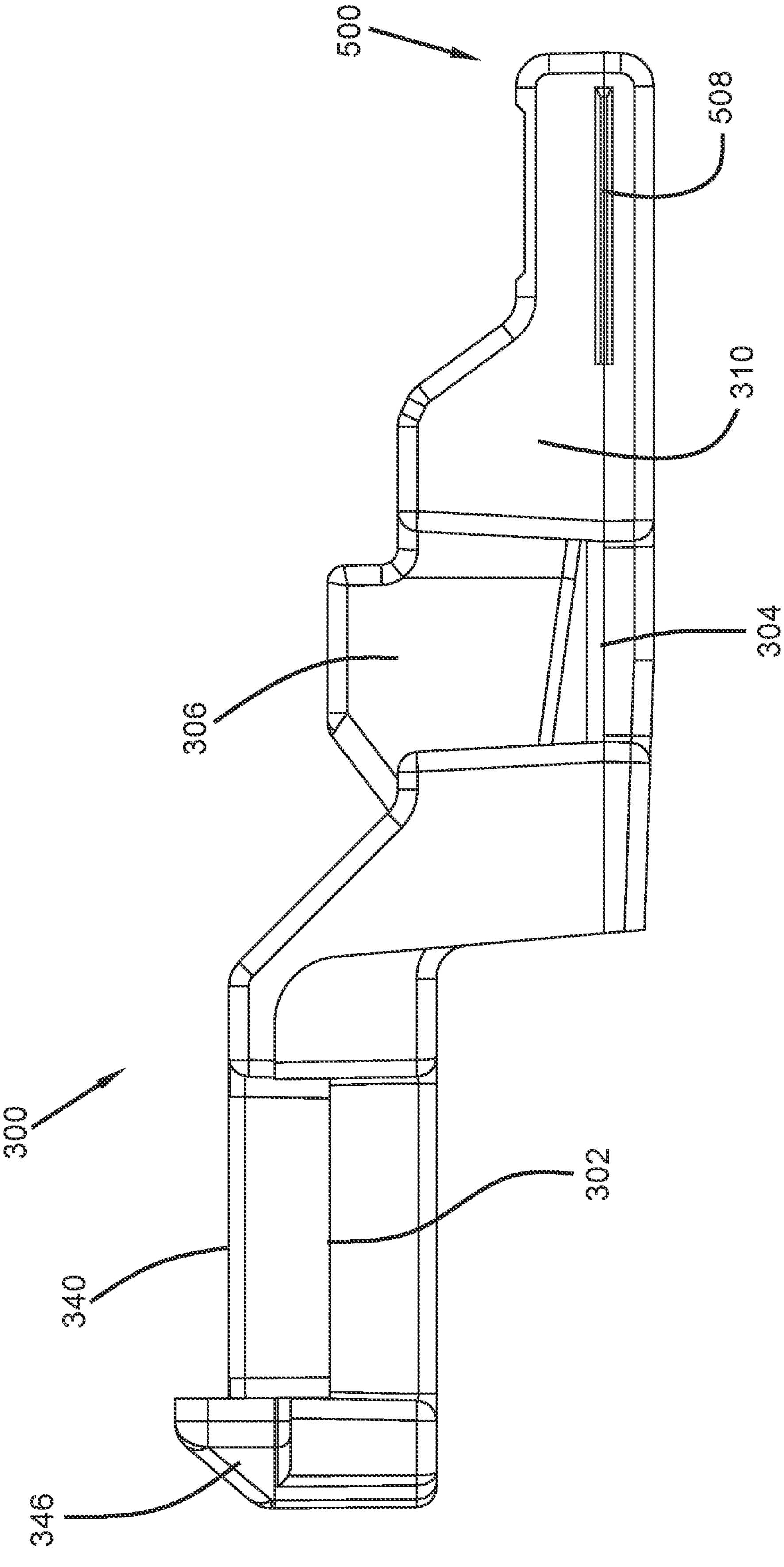
FIG. 14 is a left side view of the wire manager.
Figure 15:
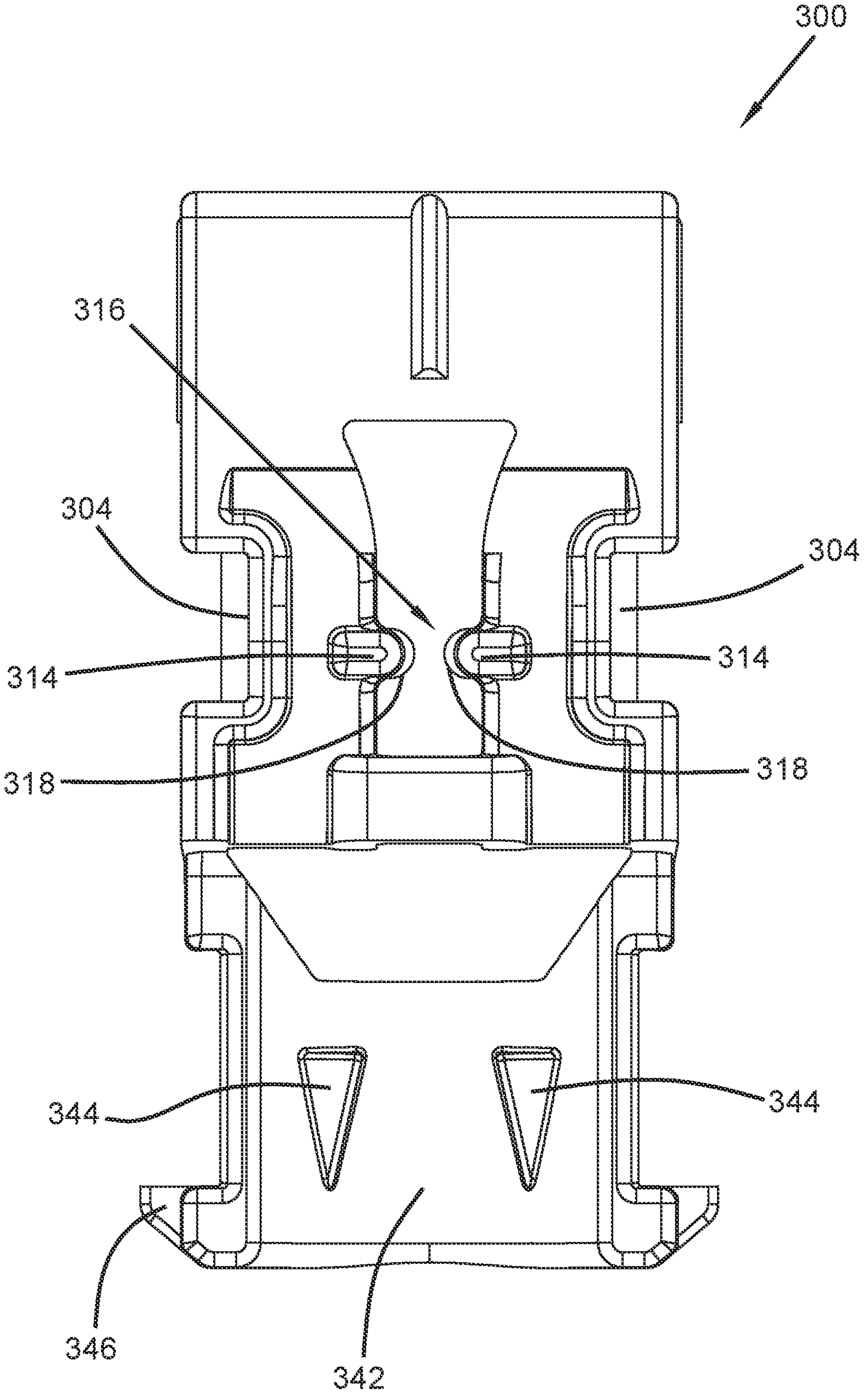
FIG. 15 is a bottom view of the wire manager.
Figure 16:
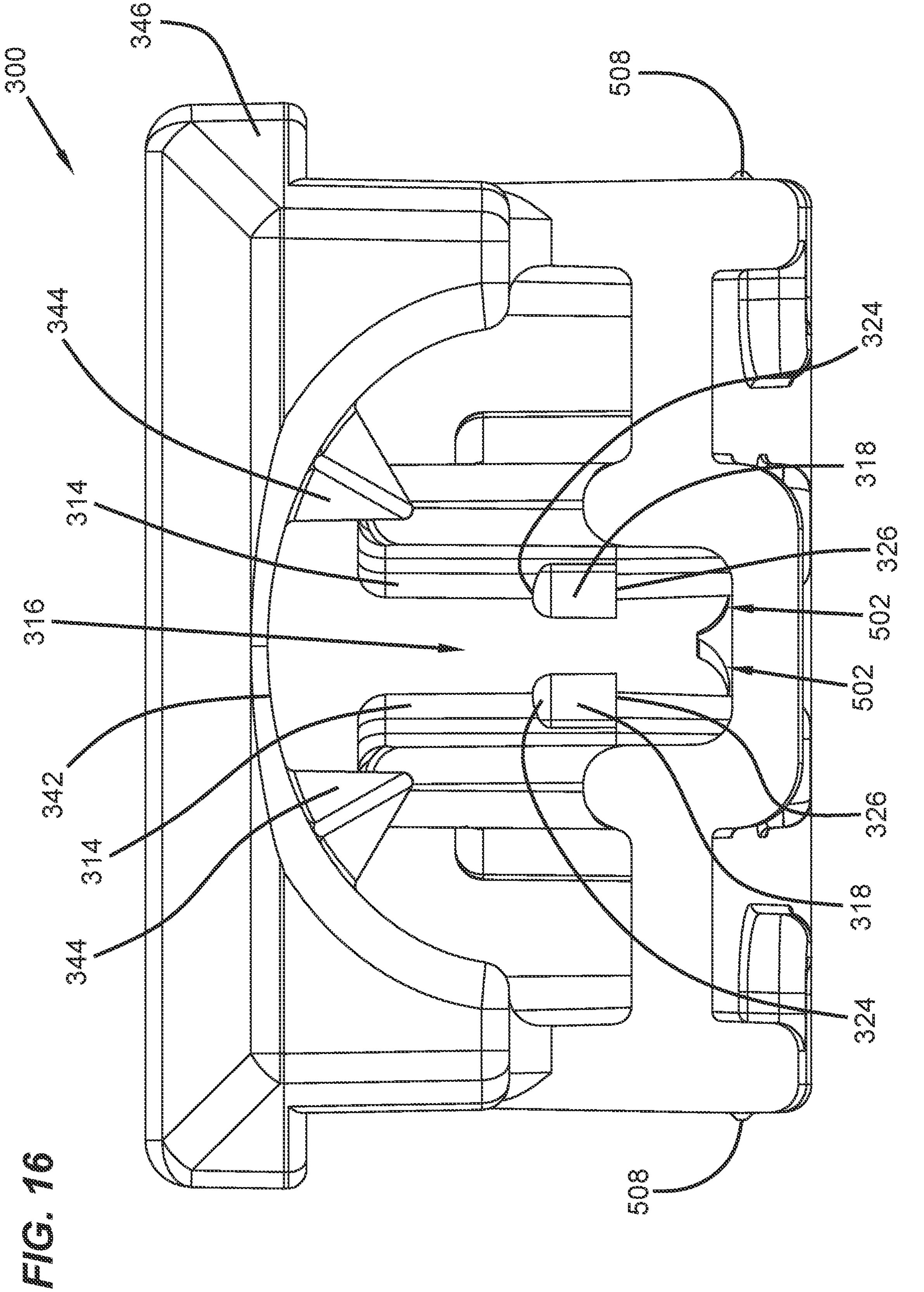
FIG. 16 is a rear view of the wire manager.

The internal walls 306 include opposing edges 314 that together define a gate 316 (see FIG. 11) in the central channel 308. The gate 316 decreases a width of the central channel 308. Additionally, the internal walls 306 further include tabs 318 that project from the opposing edges 314. The tabs 318 further decrease the width of the central channel 308. As shown in FIG. 12, the tabs 318 define an upper portion 320 and a lower portion 322 in the gate 316.

The gate 316 is structured to position pairs of twisted wires such that the pairs of twisted wires are only able to pass through the gate 316 in a stacked arrangement. Advantageously, the gate 316 maintains the twist and spacing between the pairs of twisted wires before the wires reach the wire sled 500. By maintaining the twist and spacing, the wire manager 300 substantially reduces variability in crosstalk between the wires inside the modular plug 100, and thus substantially improves the performance of the modular plug 100. Additionally, the gate 316 holds the pairs of twisted wires making it easier for a technician to untwist the wires.

A first pair of twisted wires can be pushed beyond the tabs 318 and into the lower portion 322 of the gate 316. The internal walls 306 are structured to flex in opposite directions to allow the first pair of twisted wires to be pressed beyond the tabs 318 and into the lower portion 322.

As shown in FIG. 12, each tab 318 has an upper edge 324 that is rounded to help a technician press the first pair of twisted wires from the upper portion 320, beyond the tabs 318, and into the lower portion 322 of the gate 316. Each tab 318 also has a lower edge 326 that is substantially planar and orthogonal with an internal wall 306 to help maintain the first pair of twisted wires in the lower portion 322 once pressed beyond the tabs 318.

A second pair of twisted wires is positioned in the upper portion 320 of the gate 316. As shown in FIG. 11, the internal walls 306 diverge in opposite directions to guide the individual wires from the first and second pairs of twisted wires to the wire sled 500.

The wire manager 300 further includes opposing edges 330 between the internal walls 306 and outer walls 310 that define a gate 332 in each lateral channel 312. The internal walls 306 curve in opposite directions towards the outer walls 310 to at least partially define the gates 332 in the lateral channels 312. The gates 332 in the lateral channels 312 are offset with respect to the gate 316 in the central channel 308 on the central axis AA of the modular plug 100. For example, the gates 332 are in closer proximity to the wire sled 500 than the gate 316. The gates 332 in the lateral channels 312 each position a third and a fourth pair of twisted wires.

The gates 332 decrease the width of the lateral channels 312. The gates 332 position the third and fourth pairs of twisted wires such that the wires are only able to pass through the gates 332 in a stacked arrangement. The gates 332 maintain the twist and spacing of the third and fourth pairs of twisted wires before the wires reach the wire sled 500 to substantially reduce variability in crosstalk between the wires inside the modular plug 100, and thus substantially improves the performance of the modular plug 100. Additionally, the gates 332 hold the third and fourth pairs of twisted wires making it easier for a technician to untwist the wires.

A rear portion 340 of the wire manager 300 includes a flange 346 that abuts a rear portion of the housing 200 when the wire manager 300 is inserted inside the housing 200. The rear portion 340 defines an interior surface 342 that partially fits around the jacket of the telecommunications cable 10. The interior surface 342 can have a concave shape that fits around a circular outer jacket of the cable, or may have other shapes to accommodate differently shaped cables. The interior surface 342 includes ridges 344 each having a sloped surface. The ridges 344 are configured to grip the outer protective jacket of the telecommunications cable 10 when the rear component 400 is at least partially attached to the wire manager 300.

Figure 10:
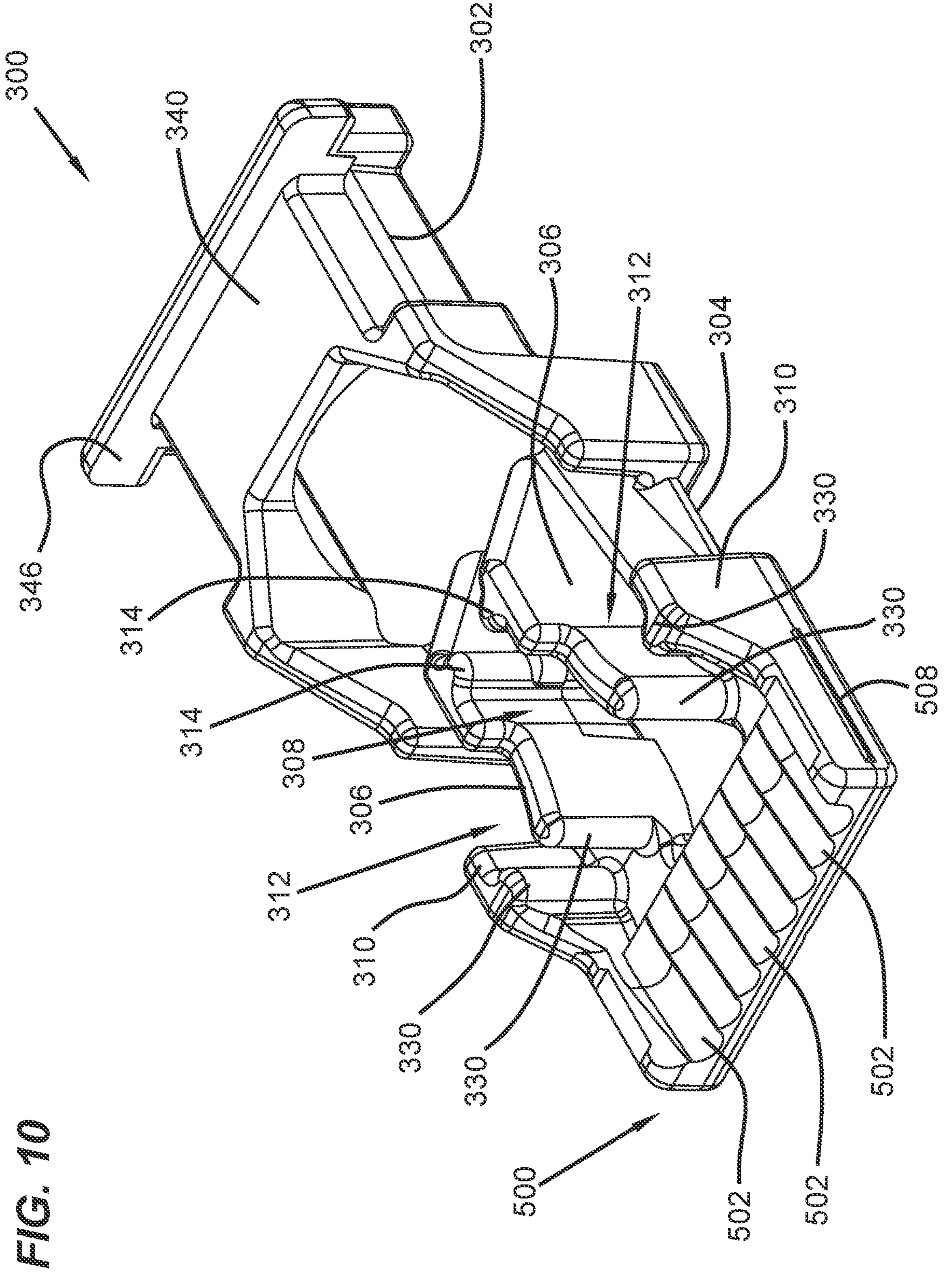
FIG. 10 is a front perspective view of a wire manager having a wire sled.

Referring now to FIGS. 10-12, while the example embodiments depicted in the figures show the wire sled 500 as integral with the wire manager 300, in alternative embodiments the wire sled 500 is a separate component that attaches to the wire manager 300. For example, the wire sled 500 can be configured to snap-fit onto the wire manager 300. The wire sled 500 extends from a distal end of the wire manager 300, and defines an array of grooves 502 that are each shaped and sized to receive an individual wire from the pairs of twisted wires.

Each groove 502 is exposed (e.g., uncovered) on the wire sled 500 to enable a crimping tool to crimp the plug contacts 110 into the individual wires positioned by the grooves 502. Once the plug contacts 110 and individual wires are crimped together, an electrical interface is created and maintained between the individual wires and the plug contacts 110 such that the plug contacts 110 can electrically connect the individual wires to the corresponding contacts of a jack.

Figure 17:
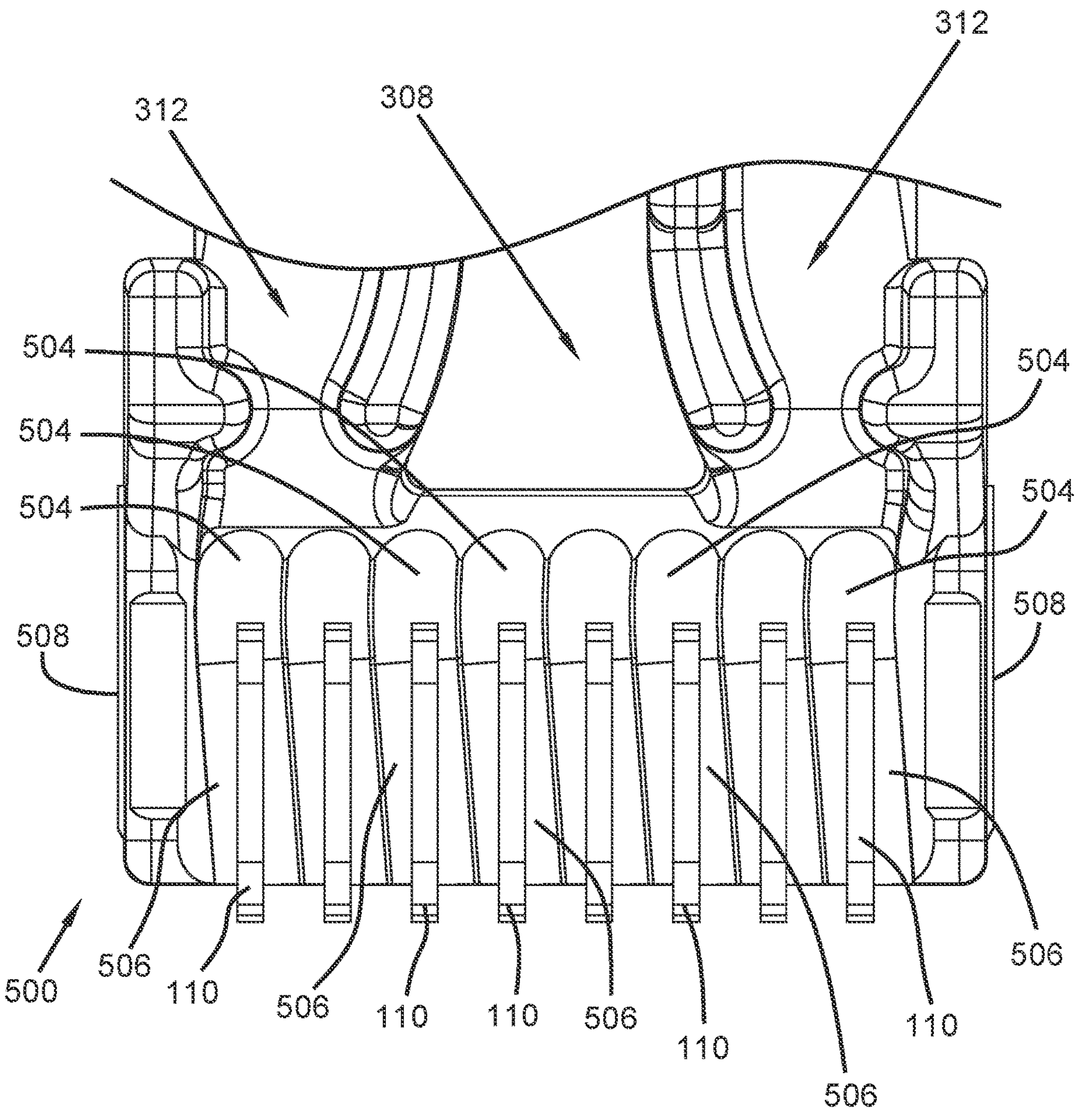
FIG. 17 is a detailed top view of the wire sled aligned with a plurality of plug contacts.
Figure 18:
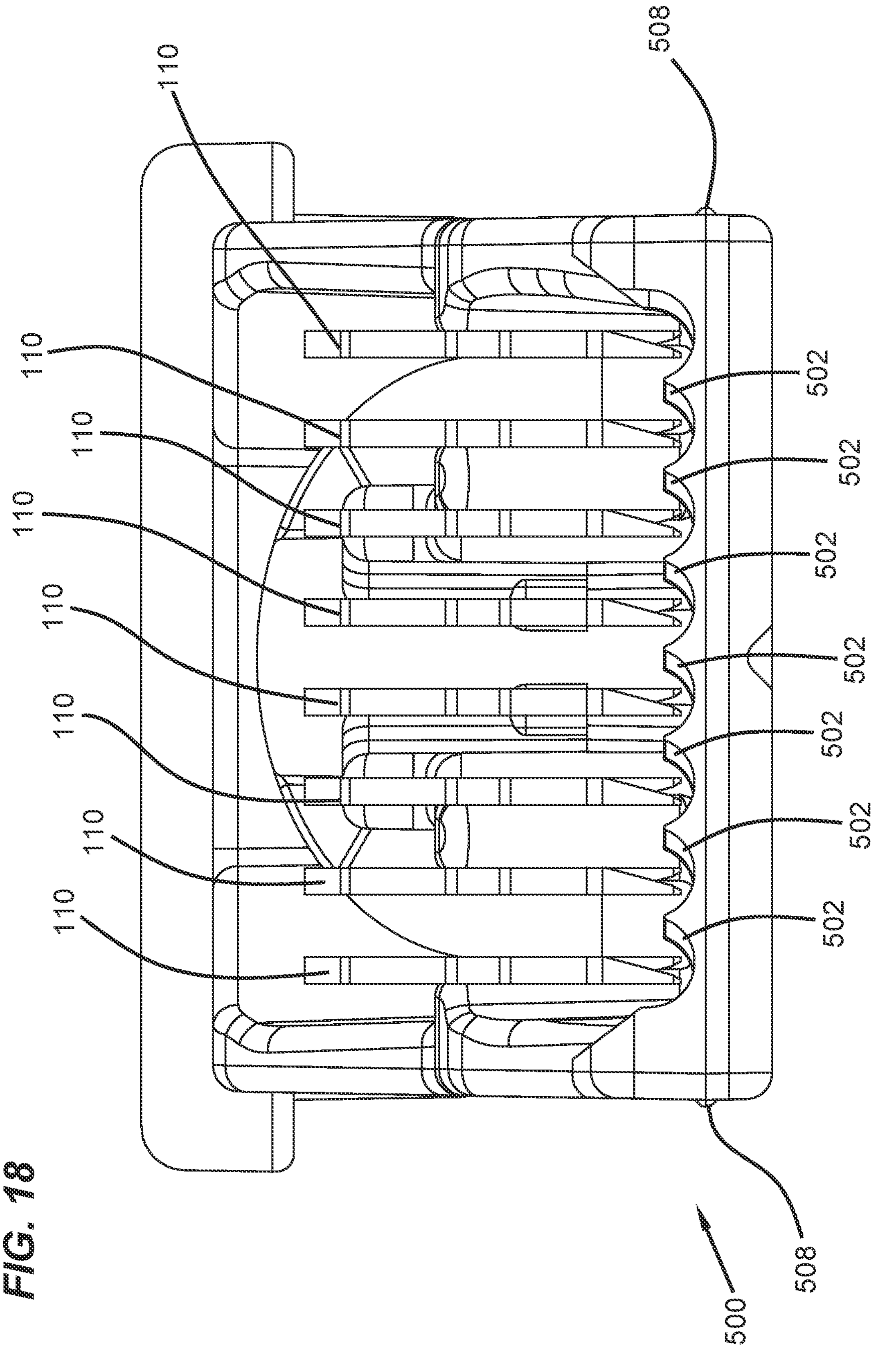
FIG. 18 is a detailed front view of the wire sled aligned with a plurality of plug contacts.
Figure 19:
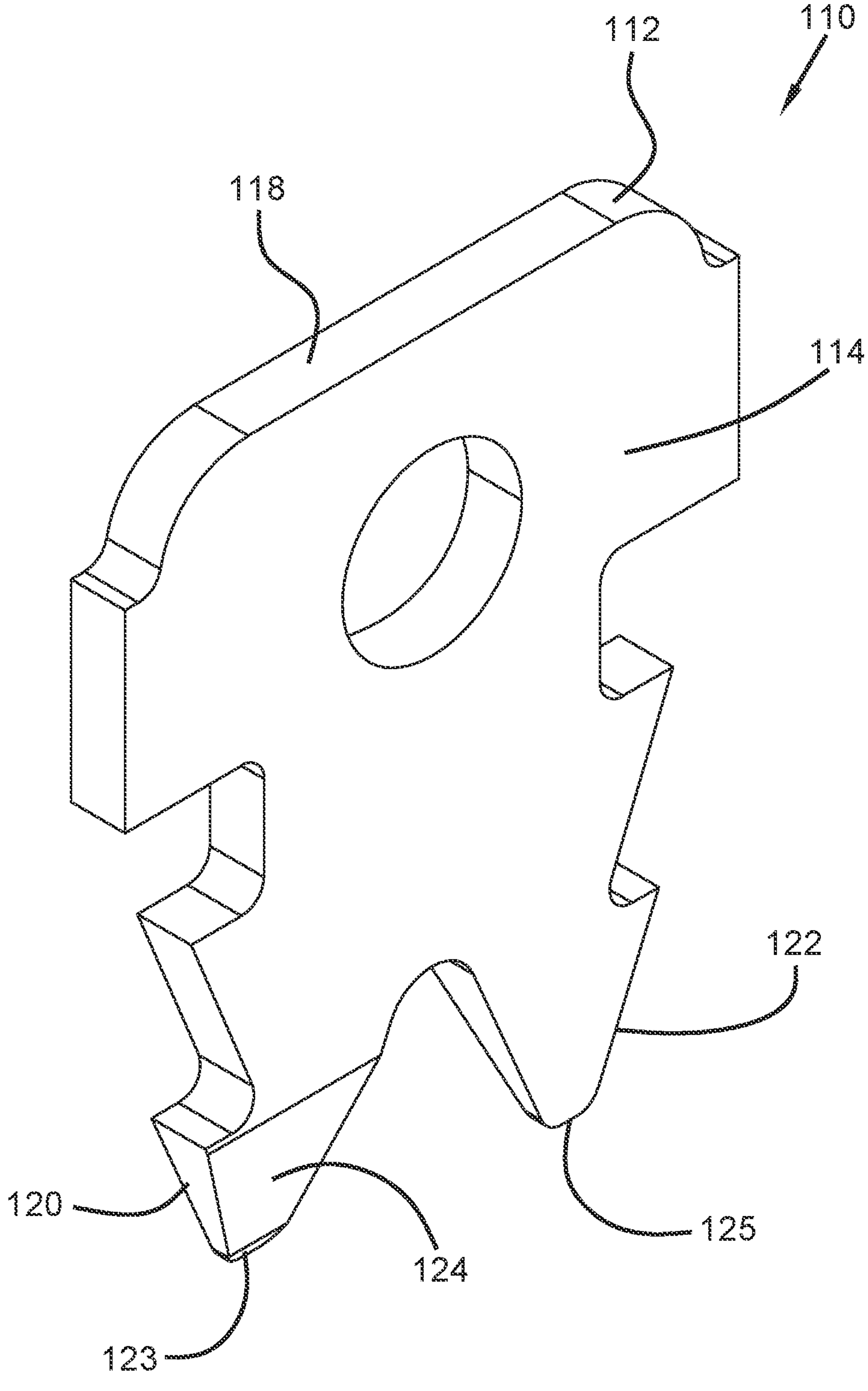
FIG. 19 is a perspective view of a plug contact.
Figure 21:
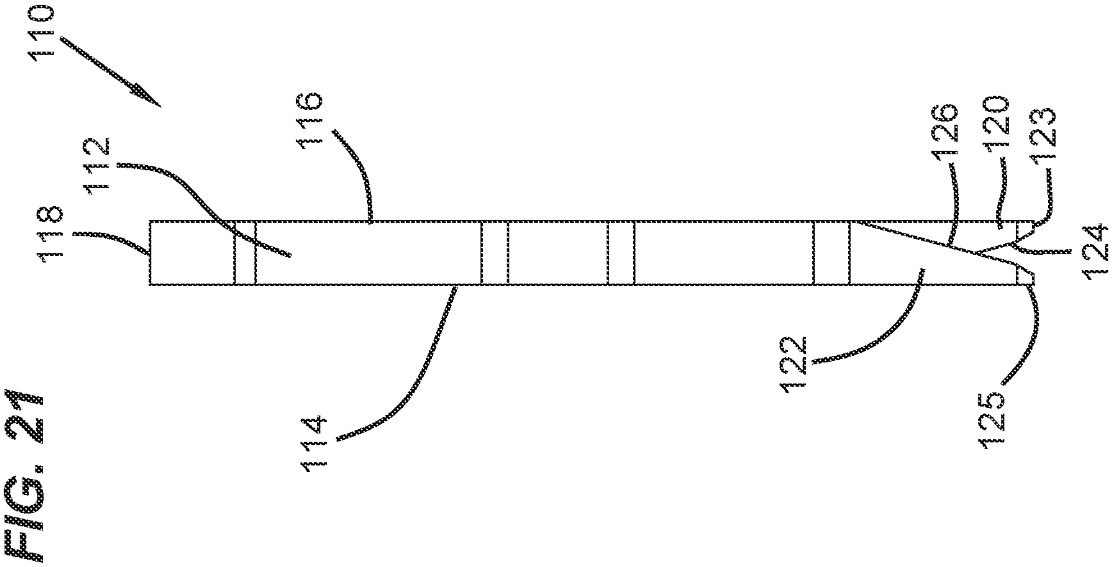
FIG. 21 is a rear view of the plug contact.
Figure 20:
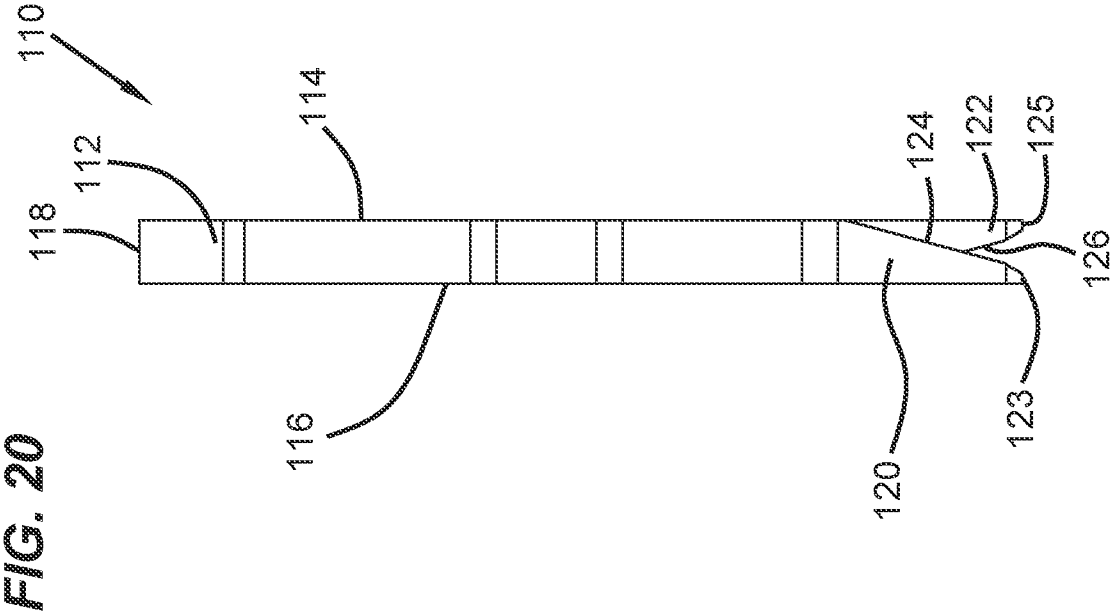
FIG. 20 is a front view of the plug contact.
Figure 23:
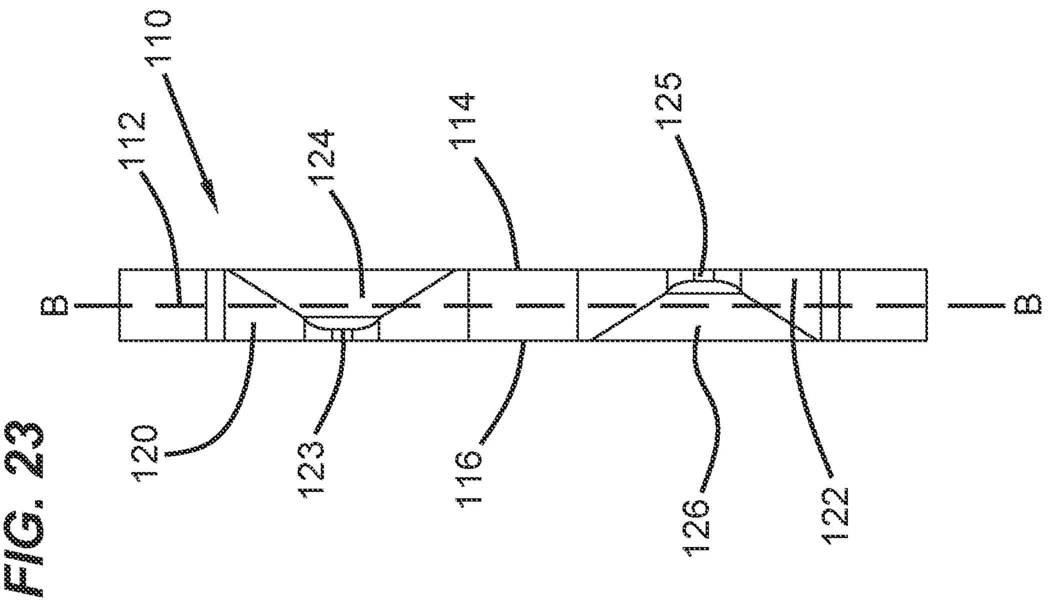
FIG. 23 is a bottom view of the plug contact.
Figure 22:
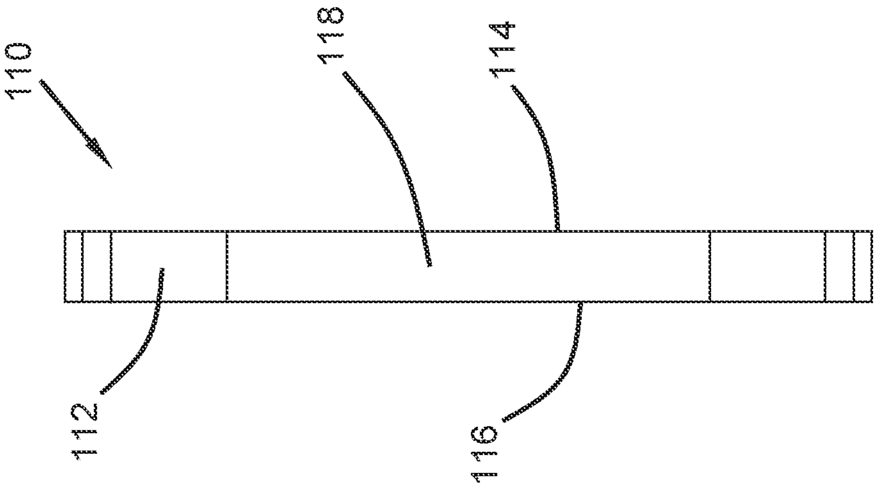
FIG. 22 is a top view of the plug contact.
Figure 24:
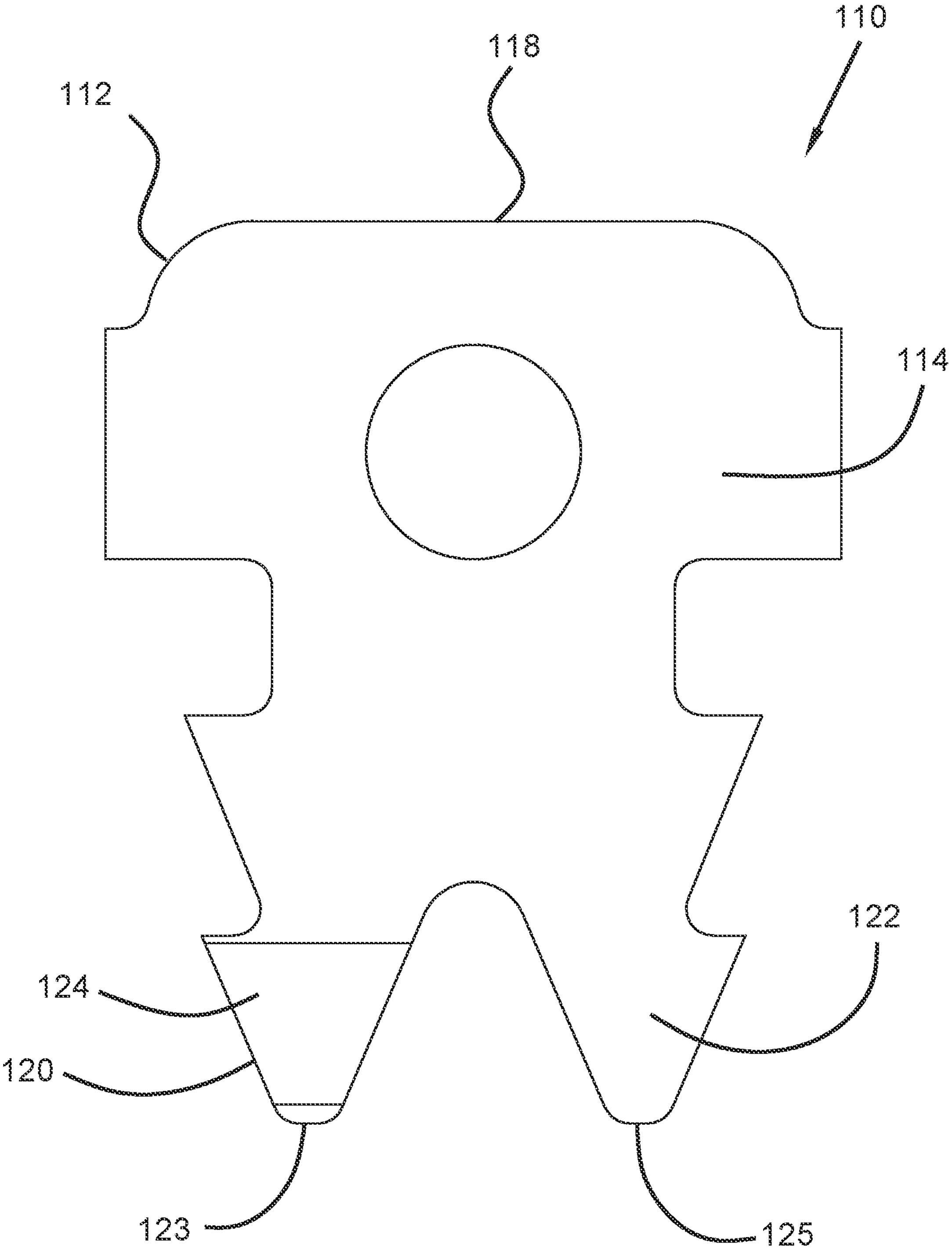
FIG. 24 is a side view of the plug contact.

FIGS. 17 and 18 are detailed top and front views, respectively, of the plurality of plug contacts 110 aligned with the wire sled 500. Referring now to FIGS. 11, 12, 17, and 18, each groove 502 in the wire sled 500 is shaped to position an individual wire, from the twisted pairs of wires in the telecommunications cable 10, at an angle with respect to the central axis AA of the modular plug 100. As described above, each plug contact 110 is held by a slot 210 to be parallel with a central axis AA of the modular plug 100. Thus, each groove 502 also positions an individual wire at an angle with respect to a corresponding plug contact 110.

Advantageously, positioning the individual wires at an angle with respect to the plug contacts 110 improves the crimping between the plug contacts 110 and the individual wires because the angle facilitates the ability to crimp the tines of each plug contact 110 on opposite sides of each individual wire so that they straddle the wire to form a more reliable connection.

While the example embodiments illustrated in the figures show the grooves 502 angled toward a right side of the wire sled 500 (see, for example, FIGS. 11 and 17), alternative embodiments are contemplated where the grooves 502 are orientated differently from what is shown in the figures to provide various angled orientations for the grooves 502 relative to the plug contacts 110. For example, in certain embodiments, the grooves 502 can be angled toward a left side of the wire sled 500. Additionally, embodiments are possible where the grooves 502 are angled in an upward or downward direction relative to a plane of the wire sled 500 such that the grooves 502 are not level along the plane of the wire sled 500. Thus, the grooves 502 may provide various angled orientations for the individual wires relative to the plug contacts 110.

FIGS. 19-24 are perspective, front, rear, top, bottom, and side views, respectively, of an example of a plug contact 110. Referring now to FIGS. 19-24, each plug contact 110 has a body 112 having first and second side surfaces 114, 116. The body 112 further has a top portion 118 that is structured to be engaged by the crimping tool to push the body 112 down inside a slot 210 of the housing 200 to engage an individual wire positioned by the wire sled 500. The top portion 118 is substantially planar. When the plug contacts 110 are pushed down inside the slots 210 of the housing by the crimping tool, the plug contacts 110 and individual wires deform with some resilience such that a contact force is created to maintain an electrical connection between the plug contacts 110 and the individual wires. Thereafter, the top portion 118 is structured to provide an electrical interface between the plug contact 110 and a corresponding contact of a telecommunications jack when the modular plug 100 is inserted into the jack.

The body 112 of the plug contact 110 further includes first and second tines 120, 122 that each have a sloped surface 124, 126. As shown in the figures, the first and second tines 120, 122 are offset with respect to a central axis BB of the plug contact such at a terminal end 123 of the first tine 120 is one side of the central axis BB, while the terminal end 125 of the second tine 122 is on an opposite side of the central axis BB. The sloped surfaces 124, 126 diverge in opposite directions with respect to the central axis BB in a scissor-like manner. The offset between the first and second tines 120, 122 of each plug contact 110 is small because the plug contacts 110 are slotted close together inside the slots 210 to be aligned with the contacts of a jack.

Figure 25:
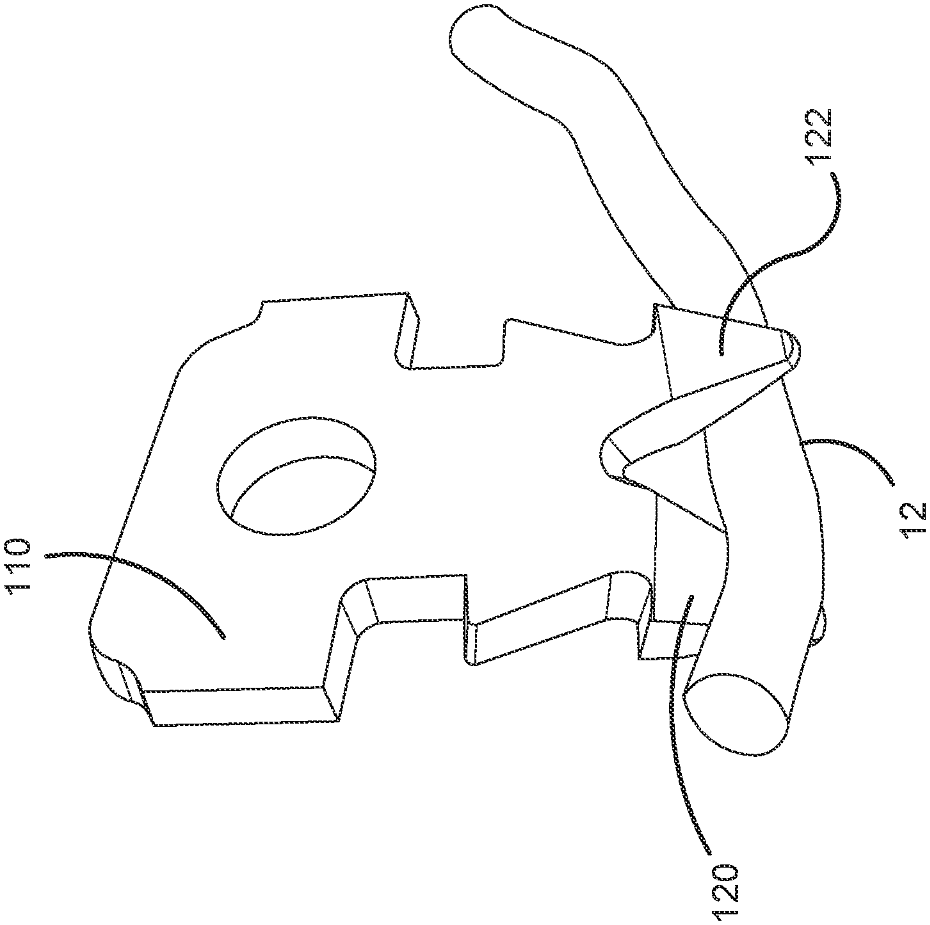
FIG. 25 is a perspective view of the plug contact crimped onto an individual wire of the telecommunications cable.

FIG. 25 is a perspective view of the plug contact 110 crimped onto an individual wire 12 of the telecommunications cable 10. Referring now to FIGS. 19-25, the sloped surfaces 124, 126 of the first and second tines 120, 122 are configured to straddle opposite sides of the individual wire 12 to form an electrical interface between the plug contact 110 and the individual wire 12. The electrical interface between the plug contact 110 and the individual wire 12 is configured to carry electrical signals back and forth between the telecommunications cable 10 and a jack. For example, the plug contact 110 transmits electrical signals from the telecommunications cable 10 to the telecommunications jack, and receives electrical signals from the telecommunications jack for transmission to the telecommunications cable 10.

A reliable connection requires that the first and second tines 120, 122 fall on opposite sides of the individual wire 12 so that the electrical interface between the plug contact 110 and the individual wire 12 is secure and stable. Referring now to FIGS. 17, 18, and 25, the grooves 502 of the wire sled 500 position the individual wires 12 of the telecommunications cable 10 at an angle with respect to the plug contacts 110 that are positioned by the slots 210 of the housing 200 to be parallel to the central axis AA of the modular plug 100. Advantageously, the angle between the individual wires 12 and the plug contacts 110 increases the likelihood that the first and second tines 120, 122 of each plug contact 110 will fall on opposite sides of an individual wire 12, and thus reduces defects during assembly of the modular plug 100.

Referring back to FIGS. 17 and 18, the grooves 502 on the wire sled 500 are positioned adjacent to the central and lateral channels 308, 312 of the wire manager 300 to provide a transition for the individual wires from the wire manager 300 to the wire sled 500.

In one embodiment, each groove 502 on the wire sled 500 has a first portion 504 and a second portion 506. The first portion 504 of each groove 502 is located toward a proximal end of the wire sled 500 and is substantially parallel to the central axis AA of the modular plug 100 to provide a smooth transition for the individual wires from the wire manager 300 to the grooves 502 of the wire sled 500. The second portion 506 of each groove 502 transitions from the first portion 504, and extends toward a distal end of the wire sled 500. The second portion 506 of each groove 502 is angled with respect to the central axis AA of the modular plug 100 to align each individual wire at an angle with respect to a plug contact 110 held by the housing 200.

The grooves 502 have a cross-sectional profile shape along a plane perpendicular to the central axis AA. The cross-sectional profile shape allows the grooves 502 to engage the exterior surface of the individual wires to help position the individual wires at an angle with respect to the plug contacts 110. In some embodiments, the cross-sectional profile shape is semi-circular. Additional cross-sectional profile shapes are possible.

In certain embodiments, the grooves 502 on the wire sled 500 are angled at an angle of about 2 degrees to about 10 degrees with respect to the central axis AA of the modular plug 100. In certain embodiments, the grooves 502 on the wire sled 500 are angled at an angle of about 3 degrees to about 8 degrees with respect to the central axis AA of the modular plug 100. In one embodiment, the grooves 502 on the wire sled 500 are angled at an angle of about 4.4 degrees with respect to the central axis AA of the modular plug 100. In some embodiments, the grooves 502 each have a length of about 0.12 inches to about 0.18 inches. In some embodiments, the grooves 502 each have a diameter of about 0.030 inches to about 0.045 inches.

Figure 26:
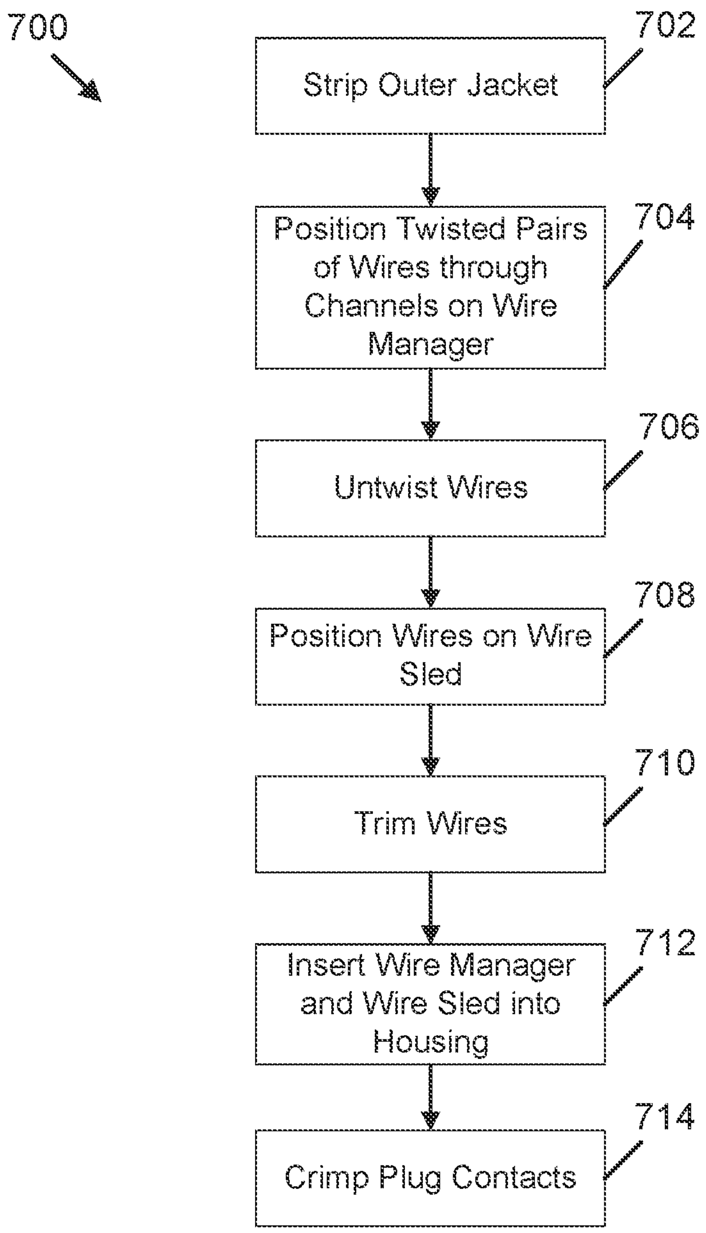
FIG. 26 illustrates a method of terminating the telecommunications cable.

FIG. 26 illustrates a method 700 of terminating the telecommunications cable 10 using the modular plug 100. The method 700 includes an initial operation 702 of striping the outer protective jacket of the telecommunications cable 10 to expose the twisted pairs of wires inside the cable. Next, the method 700 includes an operation 704 of positioning the twisted pairs of wires through the central and lateral channels 308, 312 of the wire manager 300.

Next, the method 700 includes an operation 706 of untwisting the twisted pairs of wires, and an operation 708 of positioning the wires onto the wire sled 500. As described above, the wire sled 500 defines a plurality of grooves 502 for positioning each individual wire at an angle with respect to a plug contact 110 held by the housing 200. In certain embodiments, operation 708 includes using the grooves 502 of the wire sled 500 to position the wires at an angle of about 2 degrees to about 10 degrees with respect to the plug contacts 110. In certain embodiments, operation 708 includes using the grooves 502 of the wire sled 500 to position the wires at an angle of about 3 degrees to about 8 degrees with respect to the plug contacts. In one embodiment, operation 708 includes using the grooves 502 of the wire sled 500 to position the wires at an angle of about 4.4 degrees with respect to the plug contacts.

The method 700 includes an operation 710 of trimming the wires to be flush with a distal end of the wire sled 500, followed by an operation 712 of inserting the wire manager 300 and wire sled 500 into the housing 200. As described above, the rear component 400 attaches to the wire manager 300 and includes tabs 408 that snap-fit into the slots 204 of the housing 200 to secure the wire manager 300 and rear component 400 inside the housing 200. In one embodiment, operation 712 includes using the ribs 508 of the wire sled 500 to create an interference with the housing 200 and thereby ensure that the wire sled 500 is centered inside the housing 200. Thereafter, the method 700 includes an operation 714 of crimping the plug contacts 110 held by the housing 200 to contact the individual wires positioned by the wire sled 500.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A modular plug for terminating a telecommunications cable having twisted pairs of wires, the modular plug comprising:

a housing defining an internal cavity and slots running parallel to a central axis;

plug contacts, each plug contact at least partially inserted into a slot and being structured to form an electrical interface with a wire from the twisted pairs of wires;

a wire manager positioned inside the internal cavity, the wire manager structured to receive the twisted pairs of wires inside the housing; and a wire sled extending from the wire manager, the wire sled defining grooves, wherein each groove is configured to receive a wire from the twisted pairs of wires, wherein each groove is positioned at an angle relative to a plug contact at least partially inserted into a slot of the housing, and wherein the grooves are angled toward a side of the wire sled to facilitate crimping first and second tines of the plug contact on opposite sides of the wire when the plug contact is fully inserted into the slot.

2. The modular plug of claim 1, wherein the grooves on the wire sled are positioned adjacent to the channels defined by the wire manager to provide a transition for the wires from the wire manager to the wire sled and align each wire at an angle with respect to a plug contact.

3. The modular plug of claim 1, wherein each groove has a first portion and a second portion that transitions from the first portion, the first portion being located toward a proximal end of the wire sled and being substantially parallel to the central axis, and the second portion extending toward a distal end of the wire sled and being angled with respect to the central axis.

4. The modular plug of claim 1, wherein the grooves each have a cross-sectional profile shape to engage the exterior surface of the individual wires and position the individual wires at an angle with respect to the plug contacts.

5. The modular plug of claim 1, wherein the grooves on the wire sled are angled at an angle of about 2 degrees to about 10 degrees with respect to the central axis.

6. The modular plug of claim 1, wherein the grooves on the wire sled are angled at an angle of about 3 degrees to about 8 degrees with respect to the central axis.

7. The modular plug of claim 1, wherein the grooves each have a length of about 0.12 inches to about 0.18 inches.

8. The modular plug of claim 1, wherein the grooves each have a diameter of about 0.030 inches to about 0.045 inches.

9. The modular plug of claim 1, wherein the telecommunications cable has four twisted pairs of wires, and the modular plug includes eight slots toward the distal end of the housing, eight grooves on the wire sled, and eight plug contacts.

10. The modular plug of claim 1, wherein the wire sled includes ribs on opposite sides, the ribs being structured to create an interference with the housing to ensure that the wire sled is centered inside the internal cavity.

11. The modular plug of claim 1, wherein the wire sled is integral with the wire manager.

12. The modular plug of claim 1, further comprising a rear component that snap-fits onto the wire manager to capture a distal end of the telecommunications cable between the rear component and the wire manager.

13. The modular plug of claim 12, wherein the wire manager and rear component each include ridges that are configured to engage a jacket of the telecommunications cable to secure the telecommunications cable to the modular plug.

14. The modular plug of claim 12, wherein the wire manager and rear component are both housed inside the internal cavity of the housing.

15. The modular plug of claim 12, wherein the rear component snap fits into the housing and thereby secures the wire manager to the housing.

16. The modular plug as in of claim 12, wherein the rear component includes an arm that prevents a latching handle of the housing from getting snagged.

17. A method of terminating a cable using a modular plug, the method comprising:

positioning twisted pairs of wires from the cable through one or more channels defined by a wire manager of the modular plug;

untwisting the twisted pairs of wires;

positioning the wires on a wire sled of the modular plug, the wire sled defining a plurality of grooves for positioning each wire at an angle with respect to a plug contact partially inserted into a slot of a housing of the modular plug, wherein each groove of the plurality of grooves is configured to receive a wire from the twisted pairs of wires, wherein each groove of the plurality of grooves is angled toward a side of the wire sled to facilitate crimping first and second tines of the plug contact on opposite sides of the wire when the plug contact is fully inserted into the slot;

trimming the wires to be flush with a distal end of the wire sled;

inserting the wire manager and wire sled into the housing of the modular plug; and crimping the plug contacts to contact the wires positioned by the wire sled.

18. The method of claim 17, further comprising:

using the grooves of the wire sled to position the wires at an angle of about 3 degrees to about 8 degrees with respect to the plug contacts.

19. The method of claim 17, further comprising:

using ribs on opposite sides of the wire sled to create an interference with the housing and thereby ensuring that the wire sled is centered inside the housing.

20. A modular plug for terminating a telecommunications cable having twisted pairs of wires, the modular plug comprising:

a housing defining an internal cavity and slots positioned toward a distal end, each slot being parallel to a central axis of the modular plug;

a wire manager fitted inside the internal cavity, the wire manager defining channels for positioning the twisted pairs of wires inside the housing;

a wire sled extending from the wire manager, the wire sled defining a plurality of grooves, wherein each groove is configured to receive a wire from the twisted pairs of wires, wherein each groove is positioned at an angle with respect to the central axis toward a side of the wire sled; and a plurality of plug contacts, each plug contact being partially inserted into a slot on the distal end of the housing, and wherein each plug contact has first and second tines that are structured to crimp on opposite sides of a wire positioned by a groove of the wire sled to form an electrical interface with the wire when the plug contact is fully inserted into the slot.

* * * * *